(12) United States Patent  
Lynch

(10) Patent No.: US 10,748,437 B2
(45) Date of Patent: Aug. 18, 2020

(54) LEARNING AID APPARATUS AND SYSTEM

(71) Applicant: Parker Appleton Lynch, Austin, TX (US)

(72) Inventor: Parker Appleton Lynch, Austin, TX (US)

(*) Notice: Subject to any disclaimer, the term of this patent is extended or adjusted under 35 U.S.C. 154(b) by 325 days.

(21) Appl. No.: 15/676,384

(22) Filed: Aug. 14, 2017

(65) Prior Publication Data

US 2019/0051200 A1 Feb. 14, 2019

(51) Int. Cl.
*G09B 5/00* (2006.01)
*G06F 3/0354* (2013.01)
*G06F 3/038* (2013.01)
*G09B 19/00* (2006.01)
*G09B 23/28* (2006.01)
*G06F 3/01* (2006.01)

(52) U.S. Cl.
CPC .............. *G09B 5/00* (2013.01); *G06F 3/038* (2013.01); *G06F 3/03543* (2013.01); *G09B 19/00* (2013.01); *G09B 23/28* (2013.01); *G06F 3/016* (2013.01)

(58) Field of Classification Search
CPC .............. G06F 3/0354; G06F 3/03541–03547
See application file for complete search history.

(56) References Cited

U.S. PATENT DOCUMENTS

| 5,576,733 | A | 11/1996 | Lo |
| 5,894,303 | A | 4/1999 | Barr |
| 6,195,085 | B1 | 2/2001 | Becker et al. |
| 6,409,685 | B1 | 6/2002 | Merzenich et al. |
| 6,922,186 | B2* | 7/2005 | Whitcomb .............. G06F 3/016 345/163 |
| 7,980,913 | B1 | 7/2011 | DAvanzo |
| 8,199,107 | B2 | 6/2012 | Xu et al. |
| 8,207,939 | B1 | 6/2012 | Bareli |
| 8,456,438 | B2 | 6/2013 | Ciesla et al. |
| 8,944,006 | B2 | 2/2015 | Anderson et al. |
| 8,997,009 | B2 | 3/2015 | Bechtel |
| 9,075,525 | B2 | 7/2015 | Ciesla et al. |
| 9,185,885 | B2 | 11/2015 | Shani et al. |
| D748,095 | S | 1/2016 | Oikawa |
| 2010/0095896 | A1 | 4/2010 | Van Wye |
| 2011/0244963 | A1 | 10/2011 | Grant et al. |
| 2013/0215033 | A1* | 8/2013 | Kehlstadt ............ G06F 3/03543 345/163 |
| 2013/0260886 | A1 | 10/2013 | Smith |
| 2014/0273717 | A1 | 9/2014 | Judkins et al. |

(Continued)

FOREIGN PATENT DOCUMENTS

WO WO2016168738 A1 10/2016
WO WO2017015359 A1 1/2017

OTHER PUBLICATIONS

Senso Dot Vibration Switch—http://www.rehabmart.com/product/senso-dot-vibration-switch-35477.html.

(Continued)

*Primary Examiner* — Robert J Utama
(74) *Attorney, Agent, or Firm* — Traverse Legal, PLC

(57) ABSTRACT

The present invention as disclosed in various embodiments relates to apparatuses/devices, methods, and systems for engaging a user with a disability to learn by stimulating various senses of the user and providing positive responses and gratifications in response to use by the user.

6 Claims, 27 Drawing Sheets

(56) References Cited

U.S. PATENT DOCUMENTS

| | | | |
|---|---|---|---|
| 2015/0138093 A1* | 5/2015 | Young | G06F 3/0312 345/166 |
| 2017/0006824 A1 | 1/2017 | Baron et al. | |
| 2017/0027133 A1 | 2/2017 | Eidus et al. | |
| 2017/0045959 A1 | 2/2017 | Chen et al. | |

OTHER PUBLICATIONS

Spiky light up ball—http://www.cheapdisabilityaids.co.uk/spikey-light-up-ball-248-p.asp.

* cited by examiner

LEARNING AID APPARATUS AND SYSTEM

TECHNICAL FIELD

The present invention as disclosed in various embodiments generally relates to apparatuses/devices, methods, and systems for engaging a user with a disability to learn by stimulating various senses of the user and providing positive responses and gratifications in response to use by the user.

BACKGROUND

There are over 200,000 cases of autism per year and many more individuals with autism who are undiagnosed. 1 in 68 children are diagnosed with autism. Early intervention is key to progression. Autism is the fastest-growing developmental disorder, yet the most underfunded.

There is currently no system being used in a teaching setting such as a classroom or at home that effectively engages a user with a disability to learn.

SUMMARY

In various embodiments are disclosed a cursor control device for a computer or other electronic device, the cursor control device including a housing segmented to define a plurality of sections and having an outer surface, where the plurality of sections includes a first section and a second section; a sensor positioned within the housing and configured to generate data for translating motion and position of the cursor control device to move and position a cursor on a display screen of the computer or other electronic device; a first plurality of projections disposed on the first section and extending from the outer surface; and a second plurality of projections disposed on the second section and extending from the outer surface, the second section having at least one of a size, shape, color, texture, or pattern that is different from the first section; wherein at least one of the first and second sections is selectively deflectable relative to the other and is configured to be an actuator. In various embodiments, the housing is sized and shaped to fit within a hand of a user.

In various embodiments, the first and second sections together have an outer surface with a combined surface area less than a total surface area of the outer surface of the housing. In other embodiments, the first and second sections have an outer surface with a combined surface area about equal to a total surface area of the outer surface of the housing. The first and second sections of various embodiments are capable of not overlapping.

In various embodiments, the outer surface of the second section has at least one of a size, shape, color, or texture that is different from the outer surface of the first section. In various embodiments, the second plurality of projections of the second section has at least one of a size, shape, color, or texture that is different from the first plurality of projections.

The cursor control device of various embodiments can further include a third plurality of projections disposed on a third section of the plurality of sections and extending from the outer surface, wherein the third section has at least one of a size, shape, color, or texture that is different from the first section and/or second section; and at least one of the first, second, and third sections is selectively deflectable relative to the other sections and is configured to be an actuator. The cursor control device of various embodiments may also include a divider positioned between any of the plurality of sections.

In various embodiments, the third plurality of projections has at least one of a size, shape, color, or texture that is different from the first plurality of projections and/or the second plurality of projections. In various embodiments, the outer surface of the third section has at least one of a size, shape, color, or texture that is different from at least one of outer surface of the first or second sections.

In various embodiments, the first and second sections of the housing are both deflectable relative to each other and are both configured to be actuators. In other embodiments, the first, second, and third sections are all selectively deflectable relative to the other sections and are configured to be actuators.

In various embodiments, at least one of the first and second sections includes or is made up of an elastomeric material that can include a deformable elastomeric material. The elastomeric material of various embodiments can also include or be made up of a material capable of transmitting at least a portion of light originating from a light source including translucent or transparent materials.

In various embodiments, the first section of the housing has an outer surface with a color or texture that is different from the second section of the housing. In other embodiments, at least one of the first or second sections has an outer surface with a color or texture that is different from the color or texture of at least one of the first plurality of projections or second plurality of projections.

In various embodiments, at least one of the first plurality of projections or second plurality of projections is arranged in a pattern across at least a portion of the outer surface of the first or second sections. In other embodiments, at least one of the first plurality of projections or second plurality of projections is arranged in a pattern across the entire outer surface of the first or second sections. The pattern of various embodiments can be evenly spaced, randomly arranged, or a combination of both.

In various embodiments, at least one of the first plurality of projections or second plurality of projections includes an elastomeric material. The elastomeric material of various embodiments can include or can be made up of a deformable elastomeric material. The elastomeric material of various embodiments can also include or be made up of a material capable of transmitting at least a portion of light originating from a light source including translucent or transparent materials.

In various embodiments, the cursor control device further includes a sensory stimulator positioned within or on the housing and configured to provide a sensory stimulus, wherein the cursor control device is capable of stimulating at least three senses of a user. In other embodiments, the cursor control device is capable of stimulating at least four or five senses of a user. The stimulation of the different senses by the cursor control device of various embodiments can be accomplished substantially simultaneously or simultaneously.

In other embodiments, the cursor control device is capable of stimulating up to five senses or one, two, three, four, or five senses of a user.

In various embodiments, the sense of a user that are stimulated include, for example, sight, touch, smell, hearing, or taste.

In various embodiments, the sensory stimulator can be at least one of an edible film dispenser, a label dispenser, a scent dispensing device, a bubble generating device, or a keyboard capable display illuminations, emitting sounds, or vibrating.

In various embodiments, the cursor control device can further include a second sensory stimulator selected from the group including at least one of a sound generator, light generator, or vibration device, where the second sensory stimulator is positioned within or on the housing and is configured to provide a second sensory stimuli.

In alternative embodiments are disclosed a cursor control device including a housing; a sensor positioned within the housing and configured to generate data for translating motion and position of the cursor control device to move and position a cursor on a display screen of the computer or other electronic device; at least three sensory stimulators positioned within the housing, wherein each sensory stimulator is capable of stimulating a different sensory stimulus to a user; and a processor positioned within the housing and capable of commanding the at least three sensory stimulators to generate the different sensory stimulus. In various embodiments, at least one of the at least three sensory stimulators of cursor control device of alternative embodiments is selected from the group including an edible film dispenser; a label dispenser; a scent dispensing device; a bubble generating device; or a keyboard capable display illuminations, emitting sounds, or vibrating. In various embodiments, the other of the at least three sensory stimulators of the cursor control device of alternative embodiments can include a sound generator, light generator, or vibration device.

In various embodiments are disclosed a cursor control device for a computer or other electronic device, the cursor control device including: a housing; a sensor positioned within the housing and configured to generate data for translating motion and position of the cursor control device to move and position a cursor on a display screen of the computer or other electronic device; and a sensory stimulator positioned within or on the housing and configured to provide a sensory stimulus to a sense of smell or taste of a user or to generate bubbles. The sensory stimulator of various embodiments can be selected from the group including at least one of an edible film dispenser, a label dispenser, a scent dispensing device, or a bubble generating device.

In various embodiments, the sensor stimulator is a plurality of sensor stimulators including a first sensor stimulator configured to provide a sensory stimulus to the sense of smell or taste of the user or to generate bubbles and a second sensory stimulator configured to provide a sensory stimulus to the other of the sense of smell or taste of the user or to generate bubbles. The plurality of sensor stimulators of various embodiments can further include at least one of a sound generator, light generator, and vibration device.

In various embodiments, the cursor control device includes a transceiver for sending data to and receiving data from the computer or other electronic device or commanding the sensory stimulator to generate the sensory stimulus or bubbles.

In various embodiments, the cursor control device includes a processor capable of commanding the sensory stimulator to generate the sensory stimulus or bubbles. The processor of various embodiments can also execute a utility on the computer or other electronic device, where execution of the utility generates an interactive interface on a display screen of the computer or other electronic device.

In various embodiments are disclosed a cover for a cursor control device having a button, the cover including a first section having an outer surface and a first plurality of projections extending from the outer surface of the first section; and a second section having an outer surface and a second plurality of projections extending from the outer surface of the second section, the second section having at least one of a size, shape, color, texture, or pattern that is different from the first section; wherein at least one of the first and second sections is deflectable relative the other and is capable of engaging the button.

In various embodiments, the outer surface of the second section has at least one of a size, shape, color, or texture that is different from the outer surface of the first section. In various embodiments, the second plurality of projections of the second section has at least one of a size, shape, color, or texture that is different from the first plurality of projections.

In various embodiments, the third plurality of projections has at least one of a size, shape, color, or texture that is different from the first plurality of projections and/or the second plurality of projections. In various embodiments, the outer surface of the third section has at least one of a size, shape, color, or texture that is different from at least one of outer surface of the first and second sections.

The cover of various embodiments can further include a third plurality of projections disposed on a third section of the plurality of sections and extending from the outer surface, wherein the third section has at least one of a size, shape, color, and texture that is different from at least one of the first and second sections; and at least one of the first, second, and third sections is selectively deflectable relative to the other sections and is capable of engaging the button.

In various embodiments, the button is a plurality of buttons, the first section is capable of engaging at least one of the plurality of buttons, and the second section is capable of engaging others of the plurality of buttons. In other embodiments, the third section is also capable of engaging one of the plurality of buttons.

In various embodiments are disclosed an interactive computing device including: a display screen; an interactive utility; a processor capable of executing the interactive utility, where execution of the interactive utility generates an interactive interface on the display screen; an external input device operably connected to the processor and configured to allow a user to interact with the interactive interface; and a plurality of external sensory stimulators capable of generating sensory stimuli outside of the display screen for stimulating at least three senses of a user, wherein at least one of the processor and input device is capable of commanding the sensory stimulator to generate the sensory stimulus. In other embodiments, the interactive computing device is capable of stimulating at least four or five senses of a user. The stimulation of the different senses by the interactive computing device of various embodiments can be accomplished substantially simultaneously or simultaneously. In various embodiments, interaction by the user with the interactive interface is capable of commanding at least one of the plurality of external sensory stimulators via the processor to generate a sensory stimulus.

In other embodiments, the interactive computing device or sensory stimulator is capable of stimulating up to five senses or one, two, three, four, or five senses of a user.

In various embodiments, the sense of a user that are stimulated include, for example, sight, touch, smell, hearing, or taste.

In various embodiments, the external input device is a plurality of external input devices or a cursor control device of any embodiment. For example, an interactive computing device including a display screen; a processor capable of generating an interactive interface on the display screen; a cursor control device operably connected to the processor, the cursor control device including a housing segmented to define a plurality of sections and having an outer surface, where the plurality of sections includes a first section and a second section; a sensor positioned within the housing and configured to generate data for translating motion and position of the cursor control device to move and position a cursor on a display screen; a first plurality of projections disposed on the first section and extending from the outer surface; and a second plurality of projections disposed on the second section and extending from the outer surface, the second section having at least one of a size, shape, color, texture, or pattern that is different from the first section; wherein at least one of the first and second sections is selectively deflectable relative to the other to generate an interaction with the interactive interface; and a sensory stimulator capable of generating a sensory stimulus outside of the display screen, wherein at least one of the processor and cursor control device is capable of commanding the sensory stimulator to generate the sensory stimulus.

In various embodiments, the interactive computing device further includes a dongle capable of connecting the processor, external input device, or plurality of external sensory stimulators to each other and configured to send data to and receive from the processor, cursor control device, and the sensory stimulator. The dongle of various embodiments can have the processor capable of executing the interactive utility. Alternatively, the interactive computing device of various embodiments can include a transceiver configured to send data to and receive from the processor, cursor control device.

The interactive computing device of various embodiments can include a mobile electronic device having a second processor operatively connected to the external input device, wherein the second processor is capable of controlling functions of at least one of the processor, external input device, and at least one of the sensory stimulator.

In various embodiments are disclosed a product packaged for sale including an external input device or cursor control device of any embodiment and a dongle of any embodiment having a processor capable of executing an interactive utility. The product packaged for sale of various embodiments can further include a charging apparatus for charging the external input device or cursor control device, a Universal Serial Bus (USB) or similar type connector, and, optionally, instructions.

In various embodiments are disclosed a teaching system including a plurality of interactive computing devices of various embodiments and a control device capable of controlling operation of each of the plurality of interactive computing devices.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION

Figure 1:
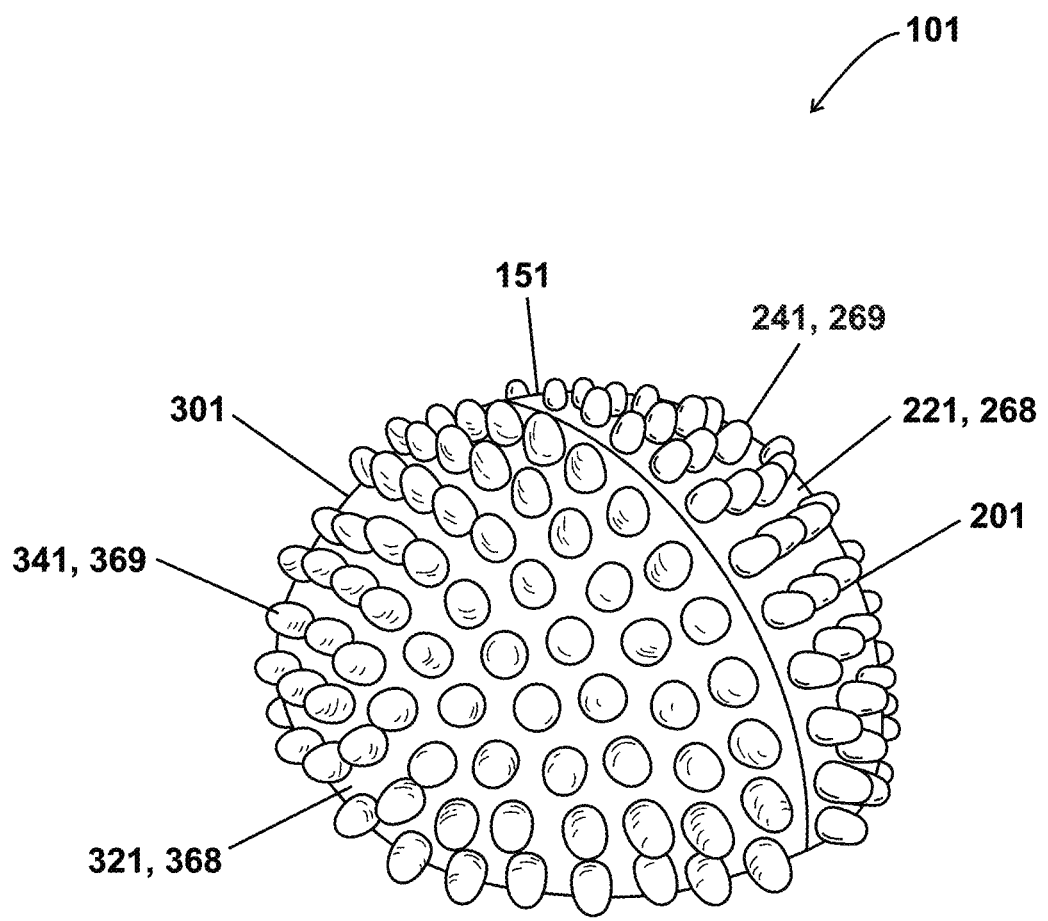
FIGS. 1, 2, 3, 4, 6, 10, 11A-11B, and 12 are perspective views showing cursor control devices of various embodiments.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Throughout this application, where publications are referenced, the disclosures of these publications in their entireties are hereby incorporated by reference into this application to more fully describe the state of the art to which this invention pertains.

It is also to be understood that this invention is not limited to the specific embodiments and methods described below, as specific components and/or conditions may, of course, vary.

Furthermore, the terminology used herein is used only for the purpose of describing particular embodiments of the present invention and is not intended to be limiting in any way.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. When one of these three terms is used, the presently disclosed and claimed subject matter can include the use of either of the other two terms.

Cursor control device 100 includes and/or refers to any cursor control device, cover, or external input device other of any embodiment 101,102,103,104,105,106,107,108,109, 110,111,112,113,114,115,116,117,2100,2150 or any element or component of the cursor control devices, covers, or external input devices of various embodiments 101,102,103, 104,105,106,107,108,109,110,111,112,113,114,115,116, 117,118, 2100,2150.

Sensory stimulator 700,800 includes and/or refers to any sensory stimulator of any embodiment 701,702,703,815, 816, 817.

External sensory stimulator 1300 includes and/or refers to any external sensory stimulator of any embodiment 1301, 1302,1303,1305.

In various embodiments are disclosed a cursor control device for a computer or other electronic device, the cursor control device including a housing segmented to define a plurality of sections and having an outer surface, where the plurality of sections includes a first section and a second section; a sensor positioned within the housing and configured to generate data for translating motion and position of the cursor control device to move and position a cursor on a display screen of the computer or other electronic device; a first plurality of projections disposed on the first section and extending from the outer surface; and a second plurality of projections disposed on the second section and extending from the outer surface, the second section having at least one of a size, shape, color, texture, or pattern that is different from the first section; wherein at least one of the first and second sections is selectively deflectable relative to the other and is configured to be an actuator. In various embodiments, the housing is sized and shaped to fit within a hand of a user.

In various embodiments, the first and second sections together have an outer surface with a combined surface area less than a total surface area of the outer surface of the housing. In other embodiments, the first and second sections have an outer surface with a combined surface area about equal or equal to a total surface area of the outer surface of the housing. The first and second sections of various embodiments are capable of not overlapping.

In various embodiments, the outer surface of the second section has at least one of a size, shape, color, and texture that is different from the outer surface of the first section. The second plurality of projections of the second section of various embodiments can have at least one of a size, shape, color, and texture that is different from the first plurality of projections of the first section of various embodiments.

In other embodiments, at least one of the first or second sections has an outer surface with a color or texture that is different from the color or texture of at least one of the first plurality of projections and second plurality of projections.

In various embodiments, the first and second sections of the housing are both deflectable relative to each other and are both configured to be actuators.

FIG. 1 is a perspective view showing a cursor control device 101. Cursor control device 101 includes a housing 151 with a first section 201 and second section 301. The first 201 and second sections 301 have outer surfaces 221, 321 and a plurality of projections 241, 341. The first plurality of projections 241 of the first section 201 preferably has at least one of a size, shape, color, and texture that is different from the second plurality of projections 341 of the second section 301. As shown in FIG. 1, the second plurality of projections 341 has a different color or texture 369 from a different color or texture 269 of the first plurality of projections 241.

In various embodiments, at least one of the first plurality of projections and second plurality of projections includes an elastomeric material. In other embodiments, at least one outer surface of the first and second sections includes an elastomeric material. The elastomeric material of various embodiments can include or can be made up of a deformable elastomeric material (i.e. rubber, silicone rubber, etc.). The elastomeric material of various embodiments can also include or be made up of a material capable of transmitting at least a portion of light originating from a light source including translucent or transparent materials.

As shown for example in FIG. 1, the cursor control device of various embodiments is shaped similar to an outer shape of a hedgehog or is "hedgehog shaped" (i.e. Hedgehog or Hedgehog E-Series or Ergonomic Series) in having an outer surface with a plurality of projections extending from the outer surface. The plurality of projections cover the outer surface in a manner, for example, similar to the spines of a hedgehog.

Figure 2:
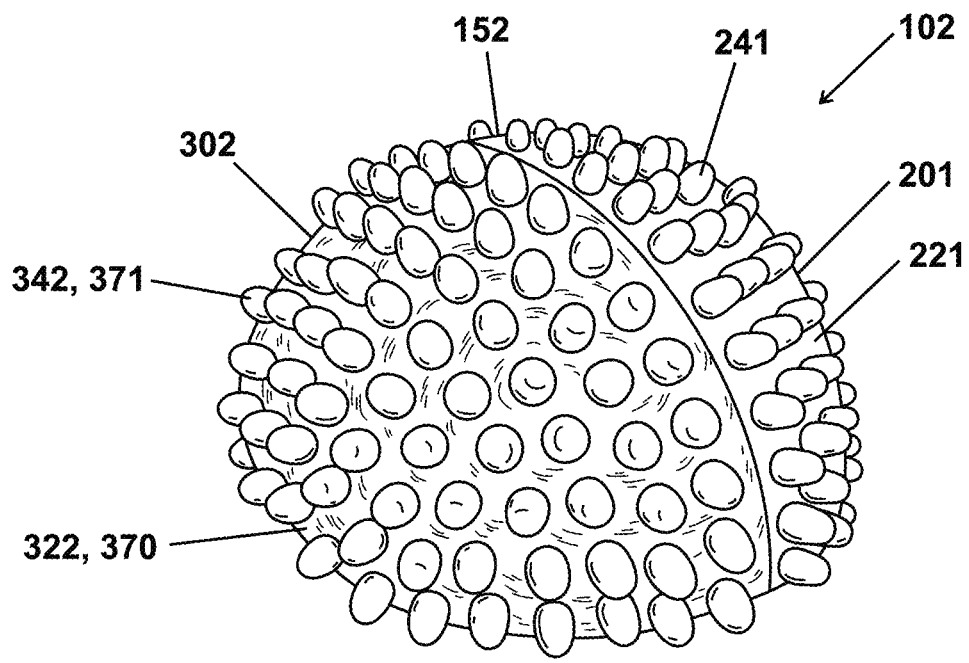
Figure 3:
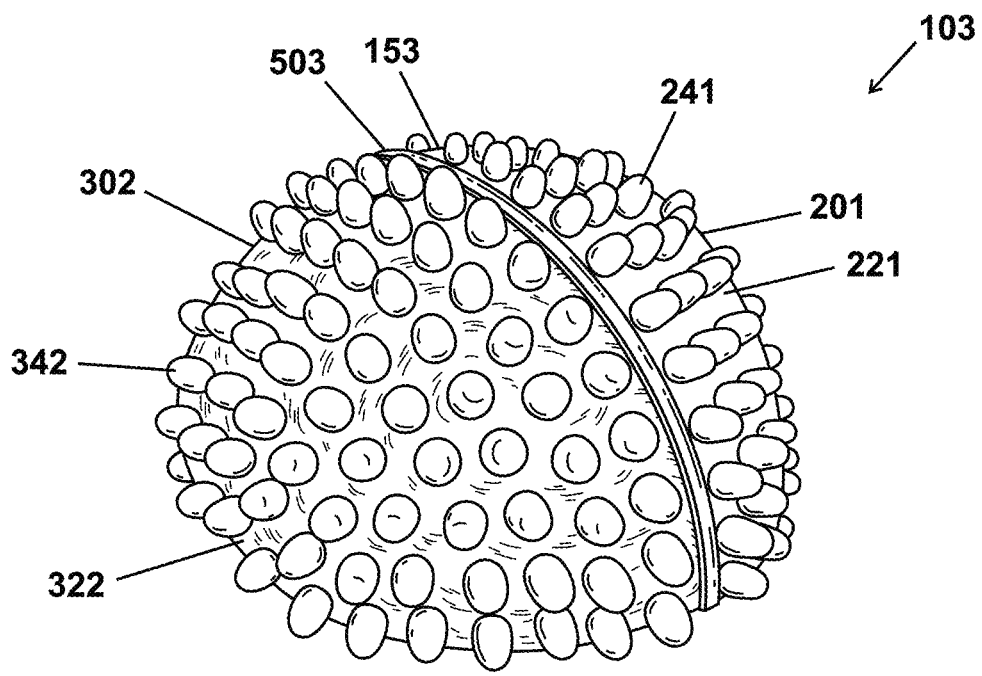

FIGS. 2 and 3 are perspective views showing cursor control devices 102,103 having a housing 152 with a first section 201 and second section 302. The second section 302 has an outer surface 322 with a color or texture 370 that is different an outer surface 221 of the first section 201. The second section 302 also has a plurality of projections 342 having a color 371 similar or the same as the plurality of projections 241 of the first section 201. Further as shown in FIG. 3, a housing 153 of cursor control device 103 may further include a divider 503 positioned between first 201 and second sections 302.

Figure 4:
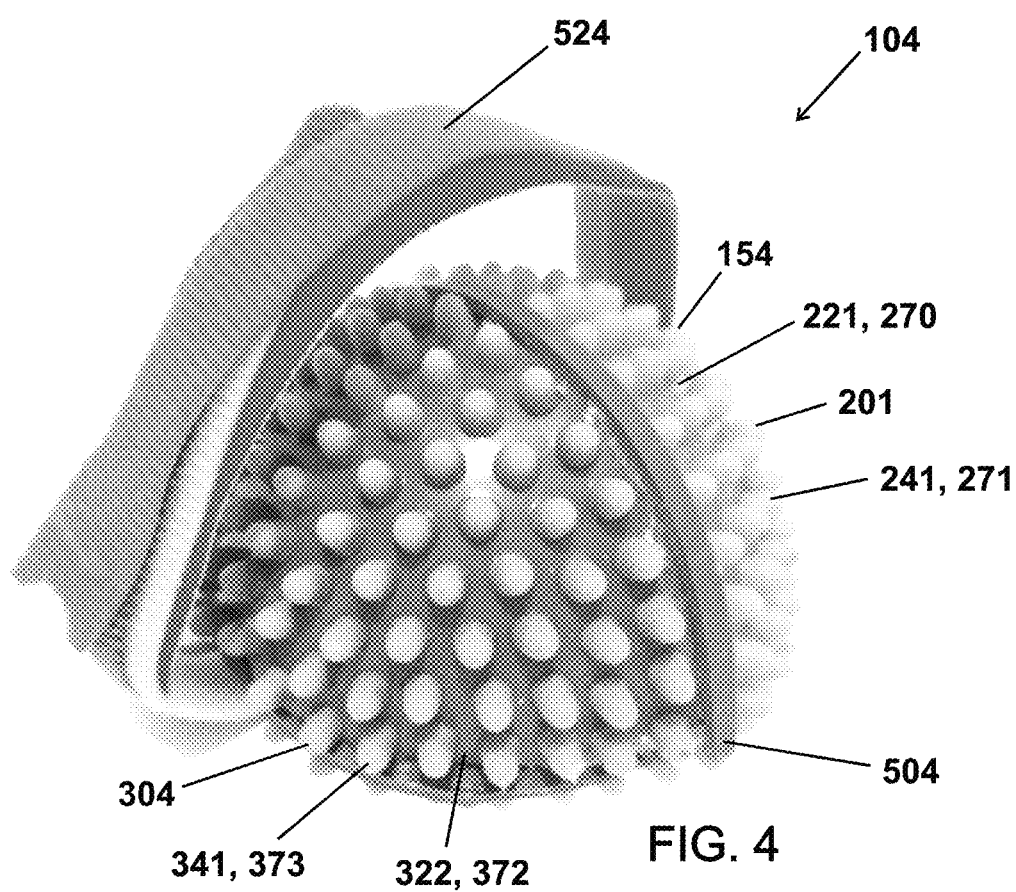
Figure 5:
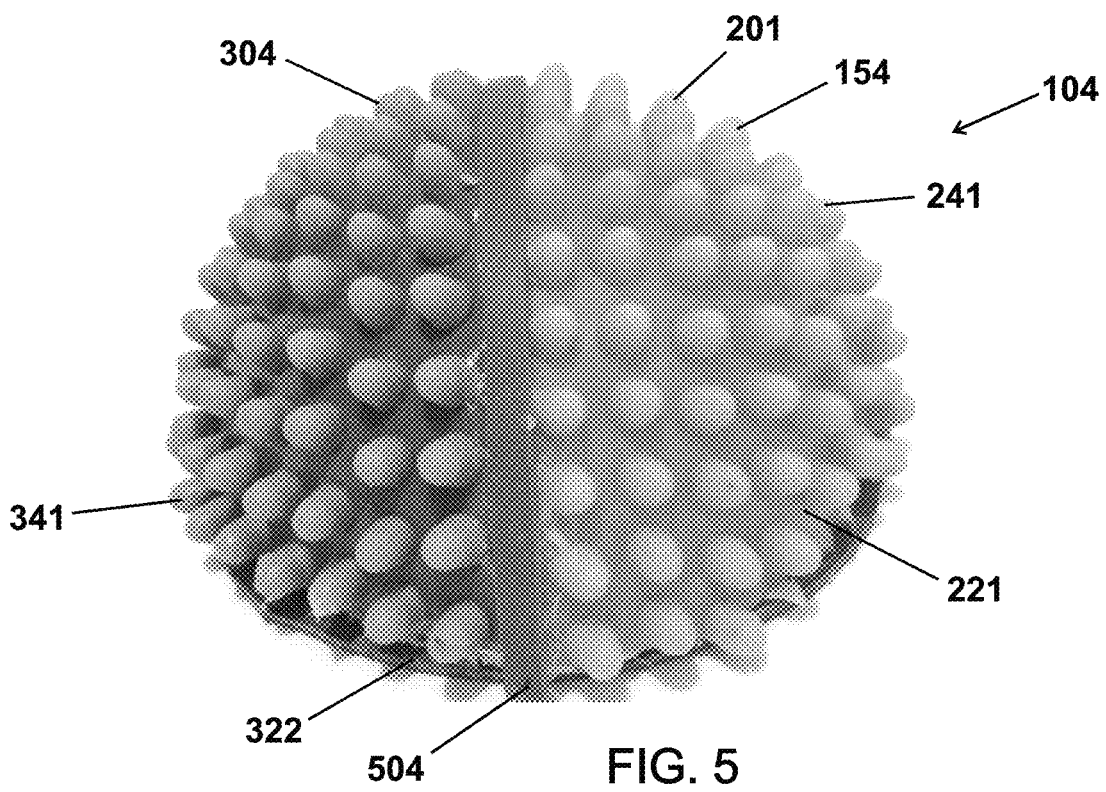
FIG. 5 is a front or rear view showing a cursor control device of various embodiments.

FIGS. 4 and 5 are perspective views showing a cursor control device 104. Cursor control device 104 includes a housing 154 with a first section 201 and second section 304. The first section 201 has an outer surface 221 and a first plurality of projections 241 extending from the surface 221. The second section 304 has a surface 322 and a second plurality of projections 341. FIGS. 4 and 5 both show that the first plurality of projections 241 has a color 271 that is the same or similar to a color 270 on the outer surface 221 of the first section 201 and different from a color on the outer surface 322 of the second section 304. Further, the second plurality of projections 341 has a color 373 different from a color 372 on the surface 322 of the second section 304, a color on the surface 221 of the first section 201, and a color on the first plurality of projections 241. FIGS. 4 and 5 both show cursor control device 104 having a divider 504 positioned between the first 201 and second 304 sections and FIG. 5 shows a strap 524 attached to cursor control device 104. The strap 524 is preferably attached to generally opposing sides of the cursor control device 104 and preferably extends above and around the housing 154 such that there is a space for a user to insert at least a portion of their hand between the strap 524 and housing 154.

Figure 7C:
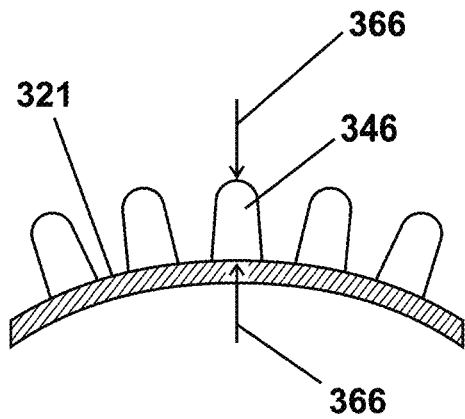
FIGS. 7B and 7C are cross sectional views showing heights of projections of various embodiments.
Figure 7B:
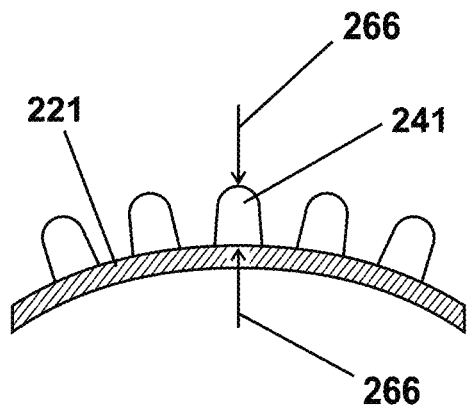
Figure 7A:
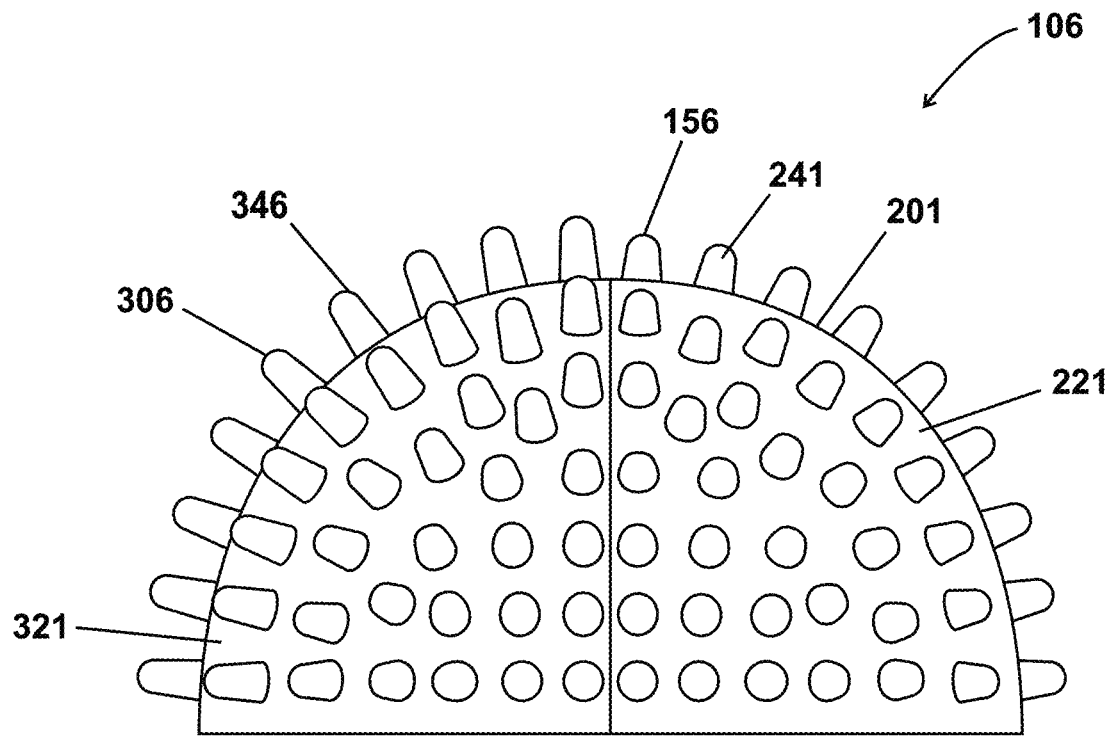
FIG. 7A is a front or rear view showing a cursor control device of various embodiments.

FIGS. 7A, 7B, and 7C show various views of cursor control device 106 having a housing 156 with first 201 and second 306 sections. The second section 306 has a second plurality of projections 346 extending from the outer surface 321. As shown in FIGS. 7B and 7C, the second plurality of projections 346 has a height 366 that is greater than a height 266 of the first plurality of projections 241. Alternatively, the second plurality of projections of various embodiments can have a height that is less than a height of the first plurality of projections.

Figure 8C:
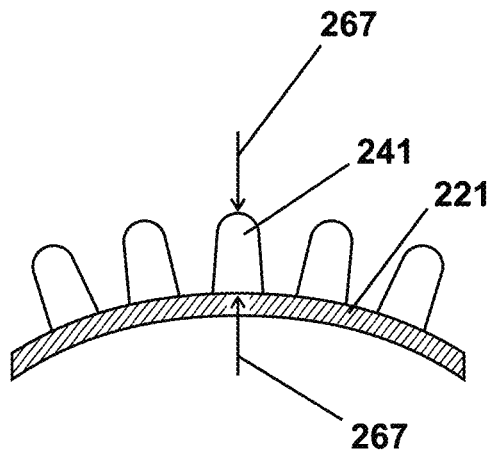
FIGS. 8B and 8C are cross sectional views showing shapes of projections of various embodiments.
Figure 8B:
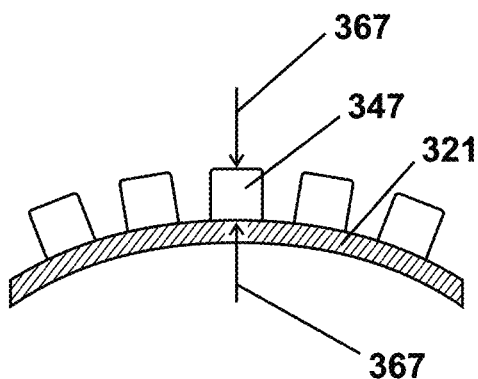
Figure 8A:
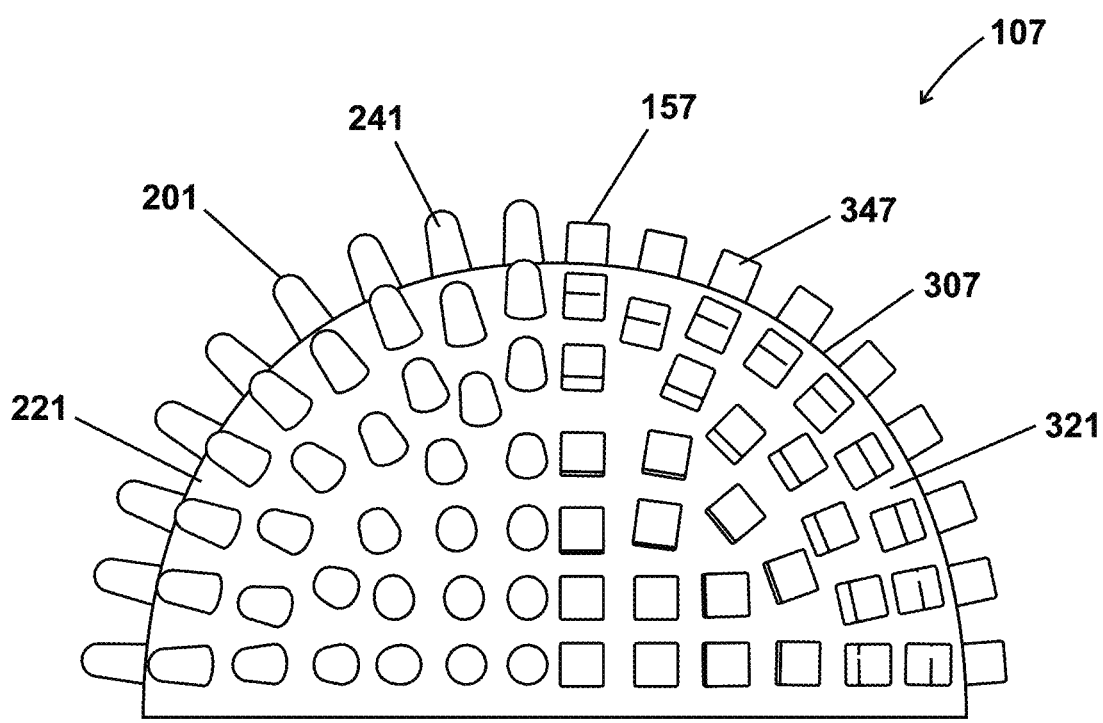
FIG. 8A is a front or rear view showing a cursor control device of various embodiments.

FIGS. 8A, 8B, and 8C show various views of cursor control device 107 having a housing 157 with first 201 and second 307 sections. The second section 307 has a second plurality of projections 347 extending from the outer surface 321. The second plurality of projections 347 has a shape 367 that is different from a shape 267 of the first plurality of projections 241. In various embodiments, the shape of the first or second plurality of projections can include various types of shapes or substantially similar shapes such as, for example, cylindrical, spherical, cube, cuboidal, conical, hemispherical, prism, pyramid, hemispherical, octahedron, tetrahedron, or dodecahedron shape. The first or second plurality of projections of various embodiments can include the projections having a plurality of shapes.

In various embodiments, at least one of the first plurality of projections and second plurality of projections is arranged in a pattern across at least a portion of the outer surface of the first or second sections. In other embodiments, at least one of the first plurality of projections and second plurality of projections is arranged in a pattern across the entire outer surface of the first or second sections. The pattern of various embodiments can be evenly spaced, randomly arranged, or a combination of both.

Figure 9:
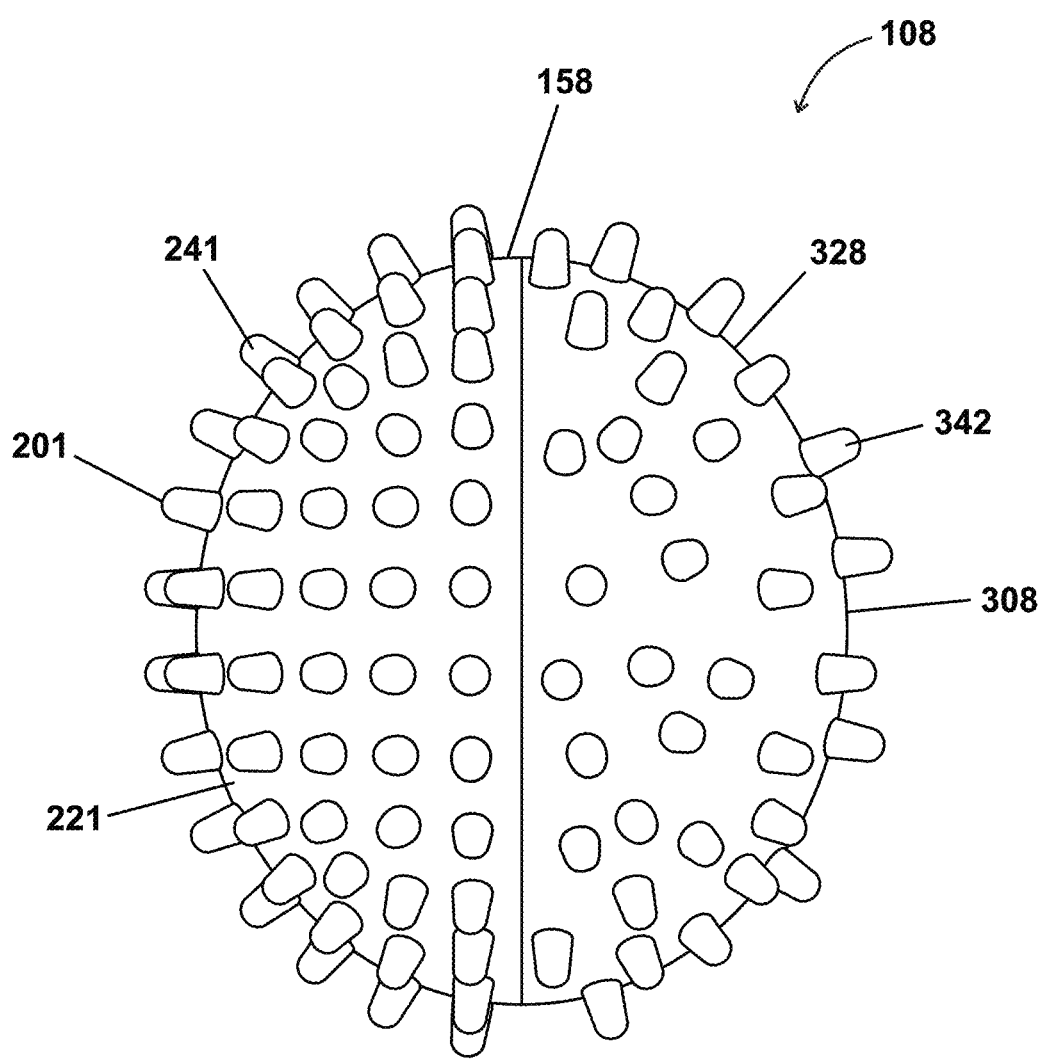
FIG. 9 is a top view showing a cursor control device of various embodiments.

FIG. 9 is a top view showing a cursor control device 108 having a housing 158 with first 201 and second 308 sections. The first section 201 has a first plurality of projections 241 arranged in an evenly spaced pattern across the outer surface 221 of the first section 201. The second section 308 has a second plurality of projections 342 arranged in a randomly spaced pattern across the outer surface 328 of the second section 308.

Figure 10:
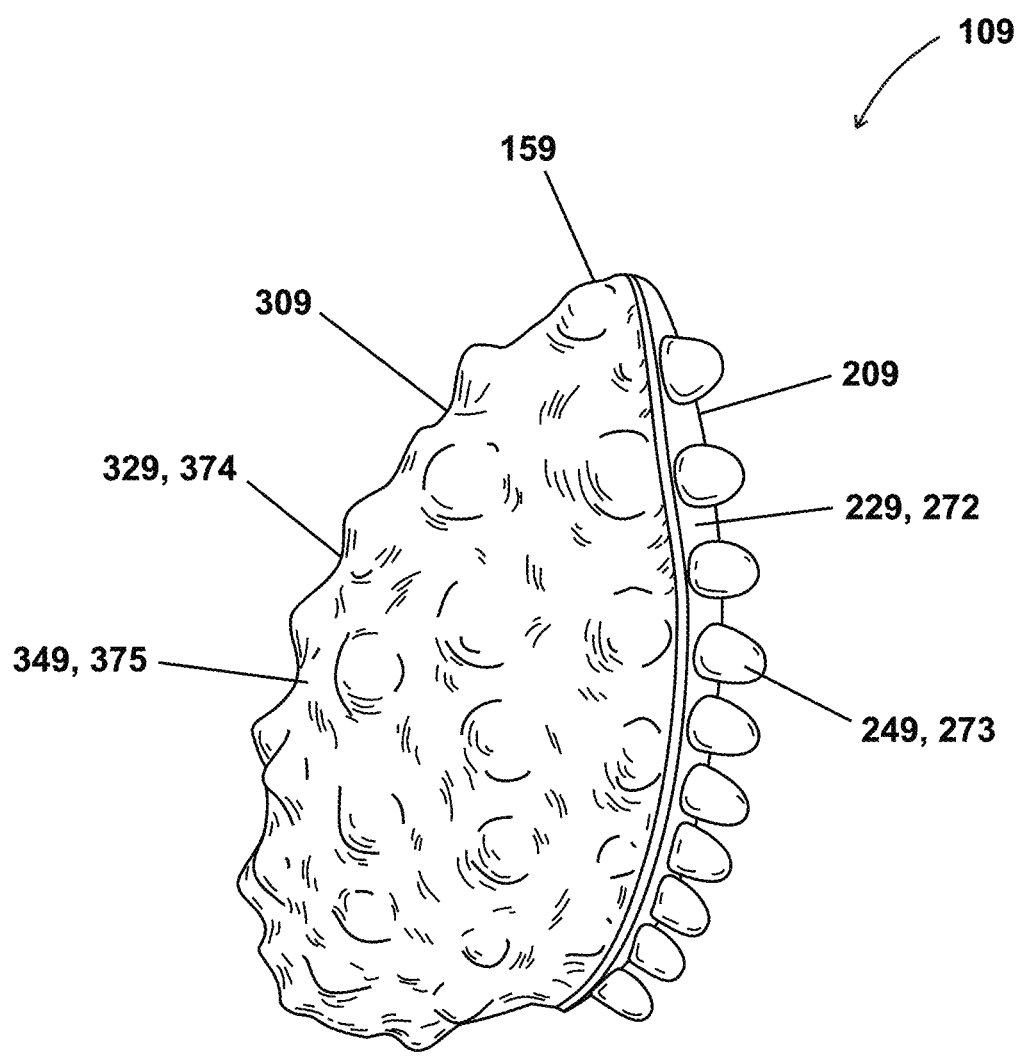
Figure 11A:
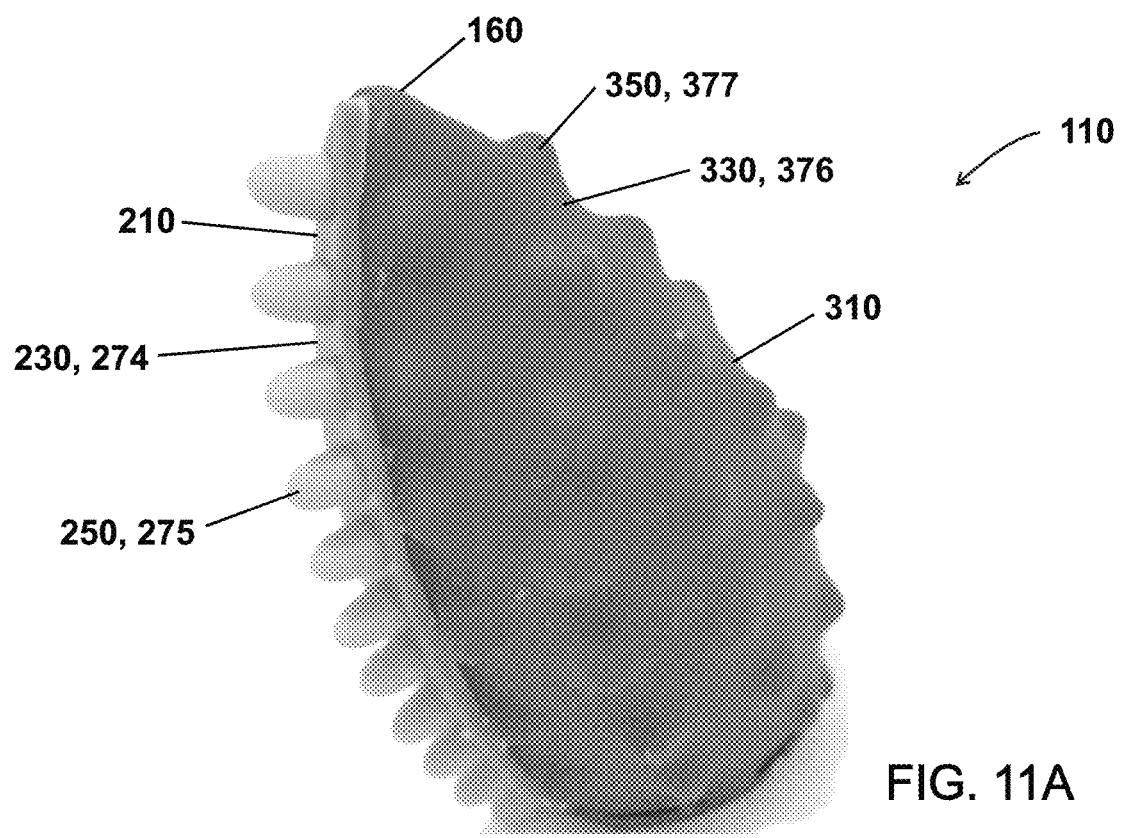
Figure 11B:
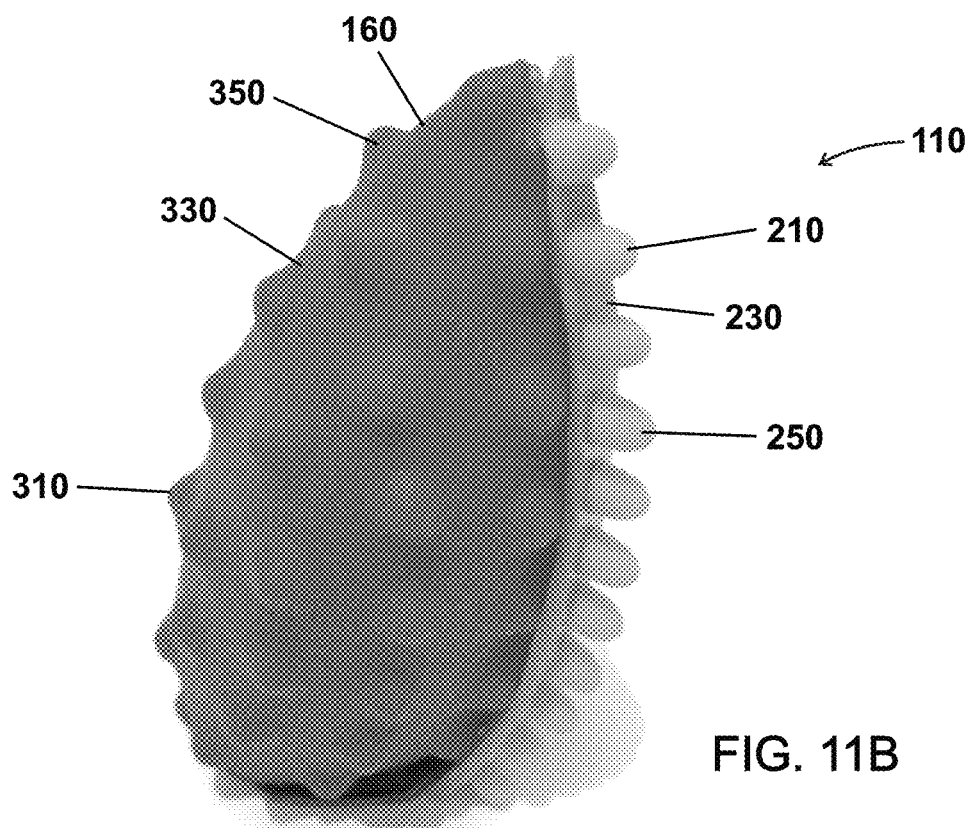

FIGS. 10, 11A, and 11B are perspective views showing cursor control devices 109,110. Cursor control device 109, 110 includes a housing 159,160 with first 209,210 and second 309,310 sections. The first section 209,210 has an outer surface 229,230 and a first plurality of projections 249,250 extending from the outer surface 229,230. The second section 309,310 has an outer surface 329,330 and a second plurality of projections 349,350. FIG. 10 shows the outer surface 229 of the first section 209 and the first plurality of projections 249 having a texture or color 272, 273 different from a texture or color 374,375 of the outer surface 329 and second plurality of projections 349,350. FIGS. 10, 11A, and 11B also show the first plurality of projections 249,250 having a different shape than the second plurality of projections 349,350. FIGS. 11A and 11B also show the outer surface 330 of the second section 310 and second plurality of projections 350 having a color 376,377 different from a color 274,275 of the outer surface 230 of the first section 210 and first plurality of projections 250.

As shown for example in FIGS. 10 and 11A-11B, the cursor control device of various embodiments is shaped similar to an outer shape of a prickly pear or is "prickly pear shaped" in having an outer surface with a plurality of projection extending from the outer surface. The plurality of projections cover the outer surface in a manner, for example, similar to the spines of a prickly pear.

Figure 12:
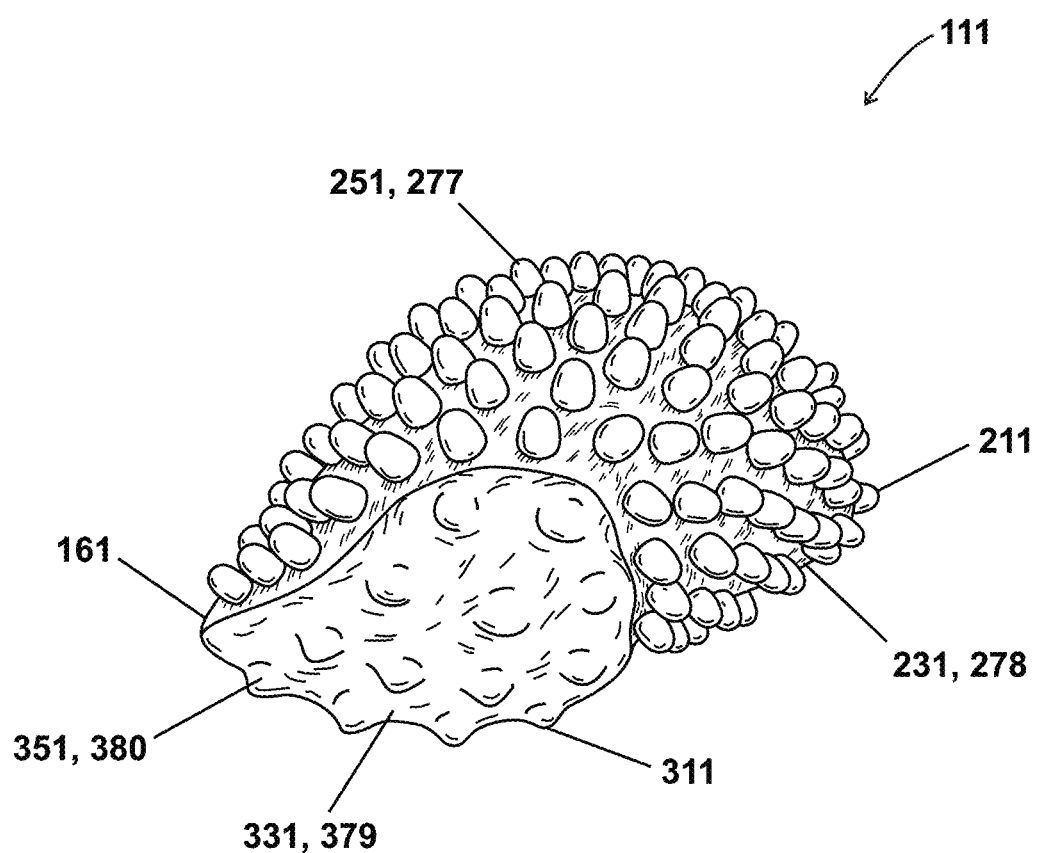
Figure 13A:
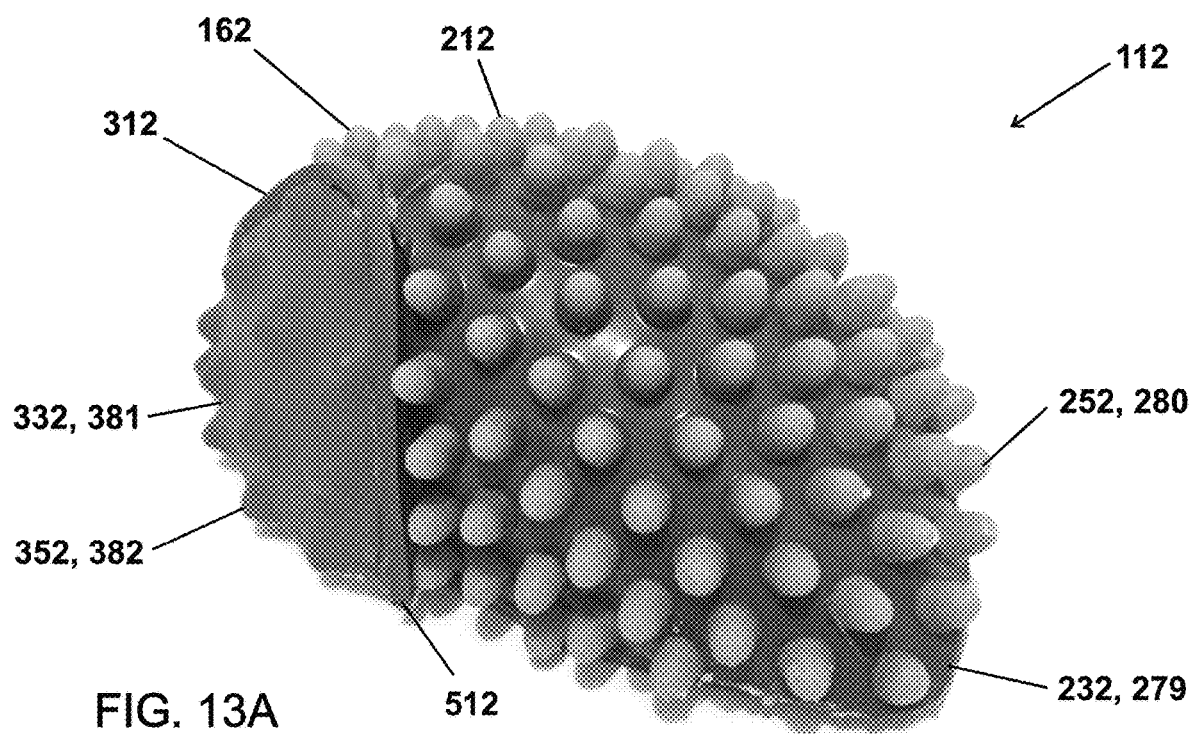
FIGS. 13A and 13B are a side view and a perspective view showing a cursor control device of various embodiments.
Figure 13B:
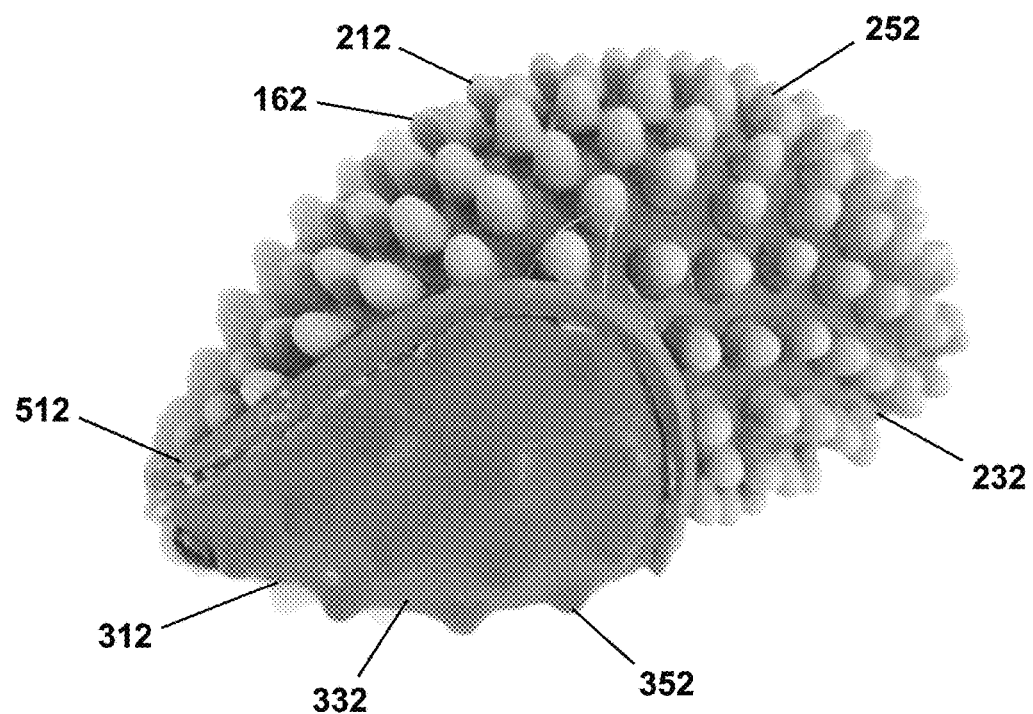

FIGS. 12, 13A, and 13B are perspective views showing cursor control devices 111,112. The cursor control devices 111,112 have a housing 161,162 with first 211,212 and second 311,312 sections. The first section 211,212 has an outer surface 231,232 and a first plurality of projections 251,252 extending from the outer surface 231,232. The second section 311,312 has an outer surface 331,332 and a second plurality of projections 351,352 extending from the outer surface 331,332. FIG. 12 shows the outer surface 231 of the first section 211 having a texture or color 278 different from a texture or color 379 of the outer surface 331 of the second section 311. FIGS. 12, 13A, and 13B also show the first plurality of projections 251,252 having a different shape than the second plurality of projections 351,352. FIG. 12 shows the outer surface 231 of the first section 211 having a color or texture 278 different from a color or texture 277 of the first plurality of projections 251. Also as shown in FIG. 12, the outer surface 231 of the first section 211 or first plurality of projections 251 can have a color or texture 277,278 that is different from a color or texture 379,380 of the outer surface 331 of the second section 311 or second plurality of projections 351.

As shown in FIGS. 13A and 13B, the second plurality of projections 352 can have a color 382 different from a color 279,280 of the first plurality of projections 252 and the outer surface 232 of the first section 212. As also shown in FIGS. 13A and 13B, the color of the second plurality of projections 352 could have a color 382 that is the same or similar to a color 381 of the outer surface 332 of the second section 312. The color 279 of the outer surface 232 of the first section 212 is different than a color 279 of the outer section 232 of the first section 212. As shown in FIGS. 13A and 13B, a divider 512 can be positioned between the first section 212 and the second section 312.

As shown for example in FIGS. 12, 13A, and 13B, the cursor control device of various embodiments is shaped similar to an outer shape of a hedgehog or is "hedgehog shaped" (i.e. Hedgehog or Hedgehog E-Series or Ergonomic Series) in having an outer surface with a plurality of projections extending from the outer surface. The plurality of projections cover the outer surface in a manner, for example, similar to the spines of a hedgehog.

The housing of cursor control device of various embodiments can further include a third plurality of projections disposed on a third section of the plurality of sections and extending from an outer surface of the third section, wherein the third section has at least one of a size, shape, color, and texture that is different from the first section and/or second section; and at least one of the first, second, and third sections is selectively deflectable relative to the other sections and is configured to be an actuator. In other embodiments, the first, second, and third sections are all selectively deflectable relative to the other sections and are configured to be actuators.

In various embodiments, the first, second, and third sections together have an outer surface with a combined surface area less than a total surface area of the outer surface of the housing. In other embodiments, the first, second, and third sections have an outer surface with a combined surface area about equal or equal to a total surface area of the outer surface of the housing. The first, second, and third sections of various embodiments are capable of not overlapping.

In various embodiments, the third plurality of projections has at least one of a size, shape, color, and texture that is different from the first plurality of projections and/or the second plurality of projections. The outer surface of the third section of various embodiments can have at least one of a color or texture that is different from the at least one of the outer surfaces of the first and second sections.

In other embodiments, the third section has an outer surface with a color or texture that is different from the color or texture of the third plurality of projections.

In various embodiments, the third plurality of projections includes an elastomeric material. In other embodiments, the outer surface of the section includes an elastomeric material. The elastomeric material of various embodiments can include or can be made up of a deformable elastomeric material (i.e. rubber, silicone rubber, etc.). The elastomeric material of various embodiments can also include or be made up of a material capable of transmitting at least a portion of light originating from a light source including translucent or transparent materials.

Figure 6:
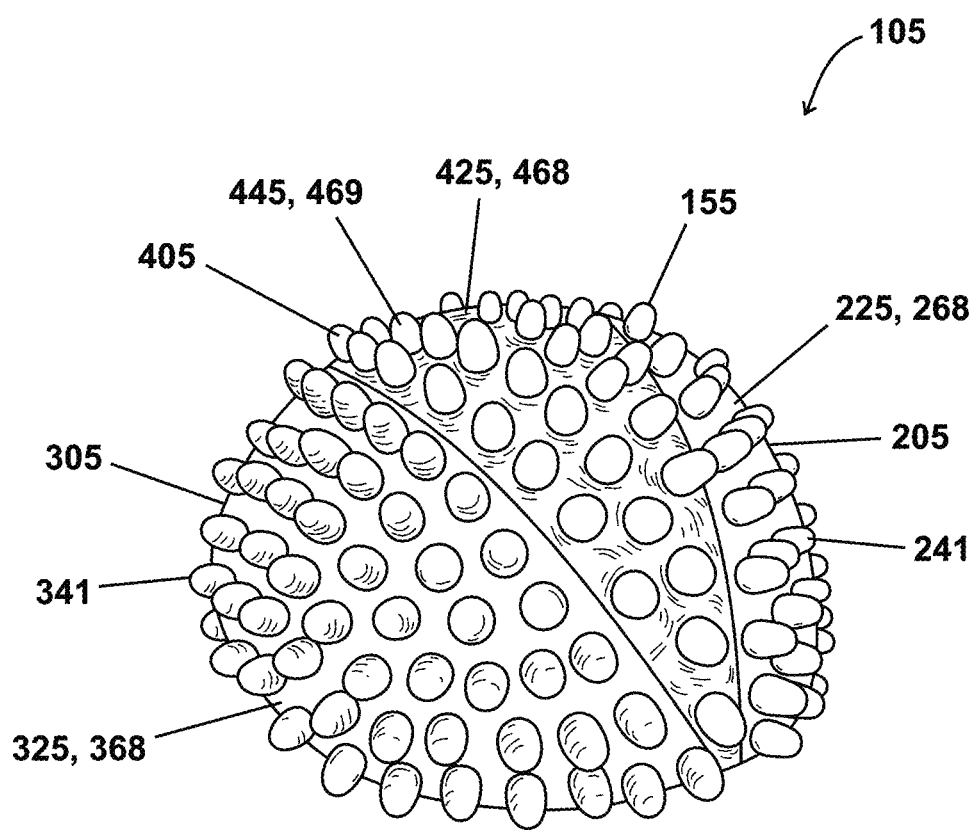

FIG. 6 is a perspective view showing a cursor control device 105 of various embodiments. Cursor control device 105 has a housing 155 with first 205, second 305, and third 405 sections. The first section 205 has an outer surface 225 and a first plurality of projections 241 extending from the surface 225, where the outer surface 225 has a color or texture 268 similar or the same as the first plurality of projections 241. The second section 305 has an outer surface 325 and a second plurality of projections 341, where the second plurality of projections 341 has a color or texture different from a color or texture 368 of the outer surface 325. The third section 405 has an outer surface 425 and a third plurality of projections 445, where the third plurality of projections 445 has a color or texture 469 different from a color or texture 468 of the outer surface 425. As shown in FIG. 6, the color of the second plurality of projections 341 could be the same or similar to the color 468 of the outer surface 425 of the third section 405. Also, the color or texture 469 of the third plurality of projections 445 could be the same or similar to the color or texture 368 of the outer surface 325 of the second section 305. In various embodiments, each of the plurality of projections 241,341,445 and each of the outer surfaces 225,325,425 of the first, second, and third sections 205,305,405 can each have a different color from the others.

In various embodiments are disclosed a cover for a cursor control device having a button, the cover including a first section having an outer surface and a first plurality of projections extending from the outer surface of the first section; and a second section having an outer surface and a second plurality of projections extending from the outer surface of the second section, the second section having at least one of a size, shape, color, texture, or pattern that is different from the first section; wherein at least one of the first and second sections is deflectable relative the other and is capable of engaging the button.

Figure 14:
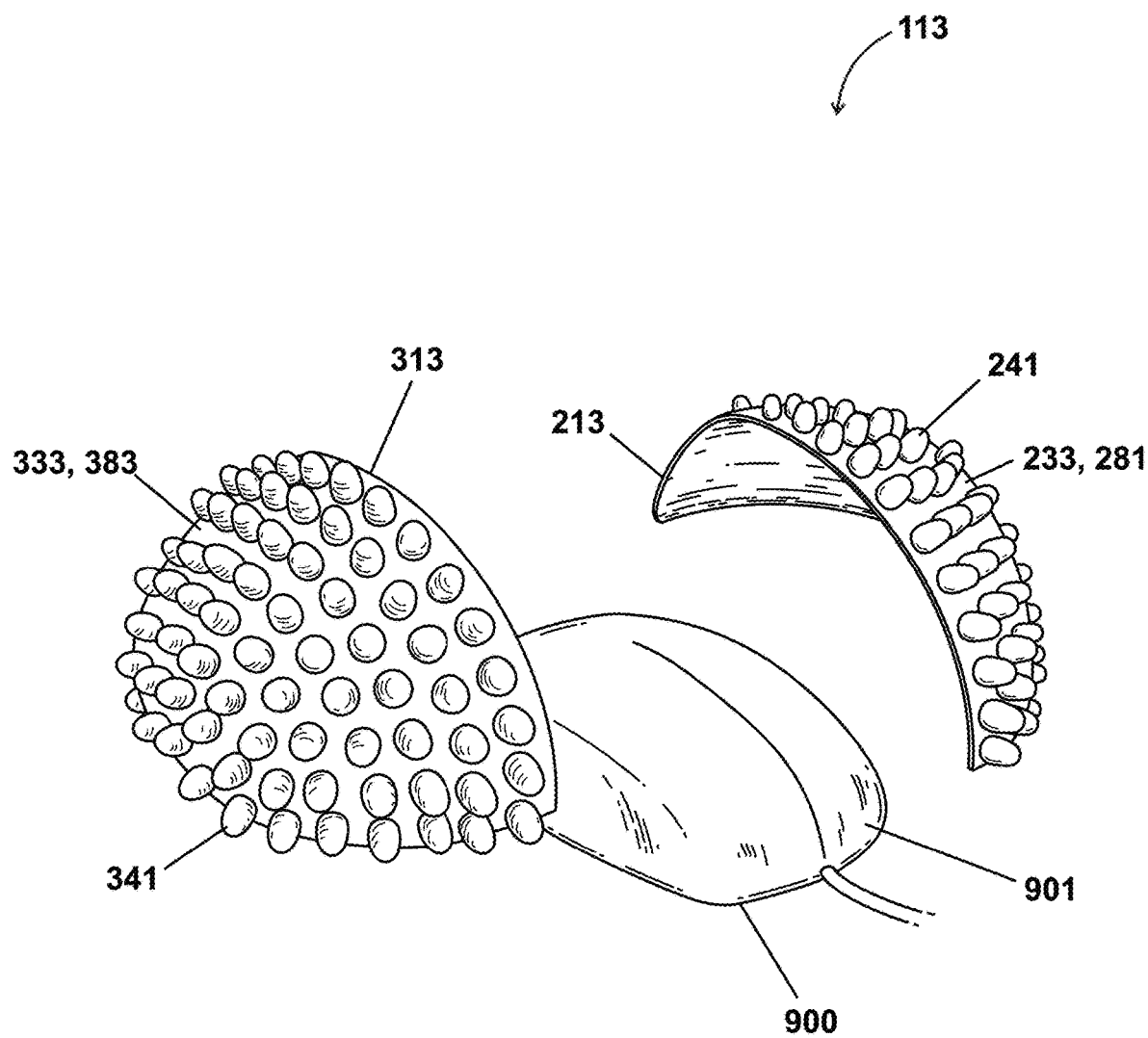
FIG. 14 is an exploded view of a cover of various embodiments for a cursor control device.

FIG. 14 is an exploded view of a cover 113 of various embodiments for a mouse 900 having a button 901. The cover 113 includes a first section 213 having an outer surface 233 and a first plurality of projections 241 extending from the outer surface 233 of the first section 213; and a second section 313 having an outer surface 333 and a second plurality of projections 341 extending from the outer surface 333 of the second section 313, the second plurality of projections 341 has at least one of a size, shape, color, and texture that is different from the first plurality of projections 241; wherein at least one of the first 213 and second 313 sections is deflectable relative the other and is capable of engaging the button 901. A shown in FIG. 14, the outer surface 333 of the second section 313 can have a color or texture 383 that is different from the second plurality of projections 341 and the outer surface 233 of the first section 213 can have a color or texture 281 that is the same or similar to the first plurality of projections 241.

In various embodiments, the outer surface of the second section has at least one of a size, shape, color, and texture that is different from the outer surface of the first section. The second section of various embodiments can have at least one of a size, shape, color, and texture that is different from the first section of various embodiments.

In other embodiments, at least one of the first or second sections has an outer surface with a color or texture that is different from the color or texture of at least one of the first plurality of projections and second plurality of projections.

The cover of various embodiments can further include a third plurality of projections disposed on a third section of the plurality of sections and extending from the outer surface, wherein the third plurality of projections has at least one of a size, shape, color, and texture that is different from the first plurality of projections and the second plurality of projections; and at least one of the first, second, and third sections is selectively deflectable relative to the other sections and is capable of engaging the button.

In various embodiments, the button is a plurality of buttons, the first section is capable of engaging at least one of the plurality of buttons, and the second section is capable of engaging others of the plurality of buttons. In other embodiments, the third section is also capable of engaging one of the plurality of buttons.

In various embodiments, the cursor control device further includes a sensory stimulator positioned within or on the housing and configured to provide a sensory stimulus, wherein the cursor control device is capable of stimulating at least three senses of a user. In other embodiments, the cursor control device is capable of stimulating at least four or five senses of a user. The stimulation of the different senses by the cursor control device of various embodiments can be accomplished substantially simultaneously or simultaneously.

In various embodiments, the sense of a user that are stimulated include, for example, sight, touch, smell, hearing, or taste.

Figure 15:
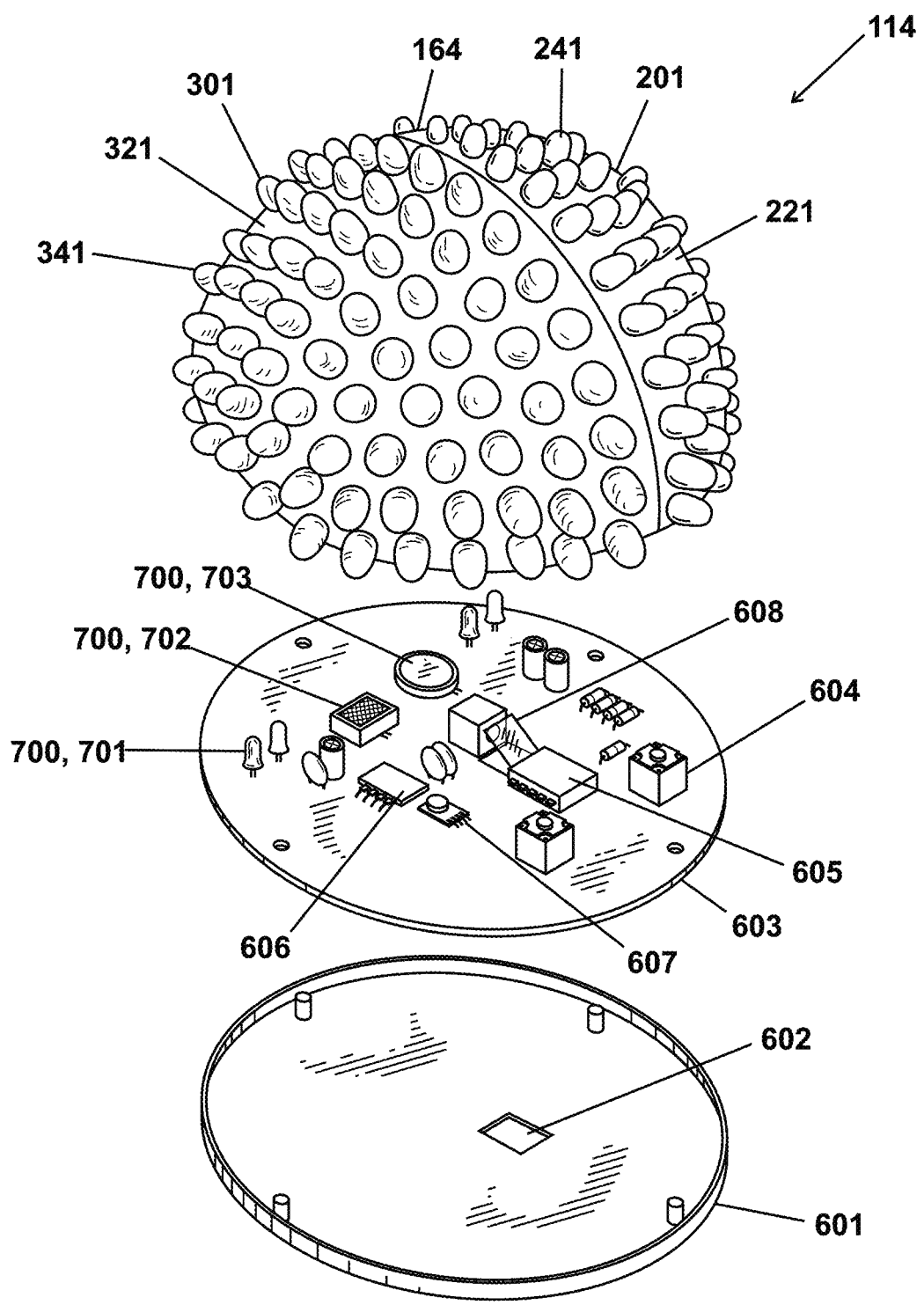
FIGS. 15, 16, and 17 are exploded views showing cursor control devices of various embodiments.

FIG. 15 is an exploded view showing cursor control device 114 having a housing 164 and a base plate capable of being removably attached to the housing 164. The housing 164 has a first section 201 with a first plurality of projections 241 extending from the outer surface 221 of the first section 201 and a second section 301 with a second plurality of projections 341 extending from the outer surface 321 of the second section 301. The base plate 164 has an opening 602. A board 603 such as a circuit board is capable of being positioned between housing 164 and base plate 601 or positioned within the housing 164 and adjacent to the base plate 601 when the housing 164 is attached to the base plate 601. A light emitting diode (LED) and prism 608 are attached to board 603 and are capable of being positioned above the opening 602 of the base plate 601 such that light from the LED is directed through the prism and through the opening 602. The LED and prism 608 are operably connected to a processor 605 such that the processor 605 acts as a sensor in being configured to generate data for translating motion and position of the cursor control device to move and position a cursor on a display screen of the computer or other electronic device. A micro-switch 604 is attached to the board and is operably connected to the first 201 or second 301 section such that the first 201 or second 301 section is selectively deflectable relative to the other and is configured to be an actuator. A transceiver 607 such as a radio frequency (RF) or Bluetooth modules and second processor 606 are also attached to the board 603. The cursor control device 114 can include a sensory stimulator attached to the board such as an LED(s) 701 that include various colored LEDs, a sound generator 702 such as a speaker, and a vibration device 703. Either processors 605,606 can control the operation of the cursor control device 114 in, for example, controlling the connection of the cursor control device 114 to another device, transfer of data to and from the cursor control device 114, and operation of the sensory stimulators including blinking or illuminating the LEDS 701, generating sounds with the sound generator 702, or vibrating the cursor control device 114 by activating the vibration device 703.

Figure 16:
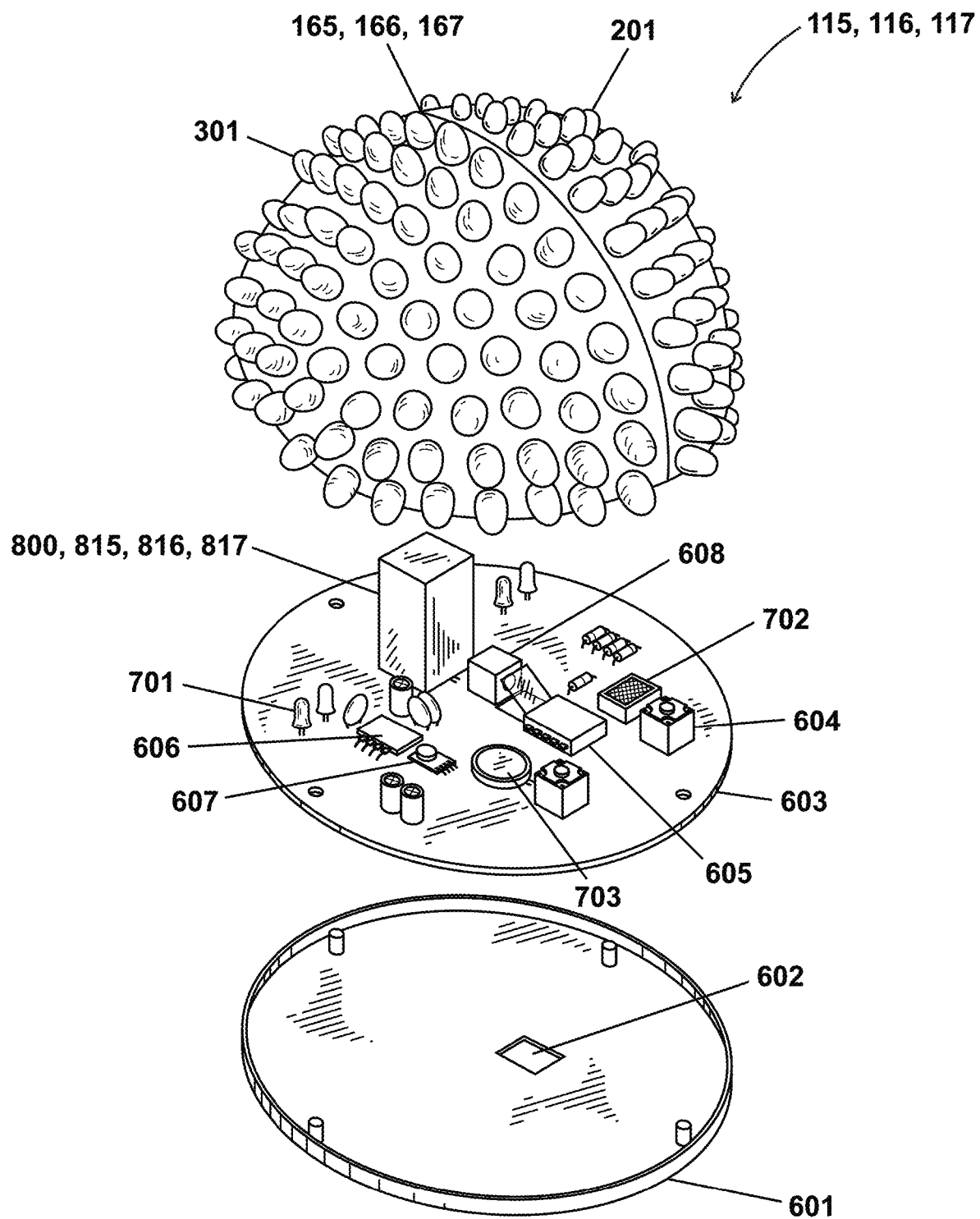
Figure 17:
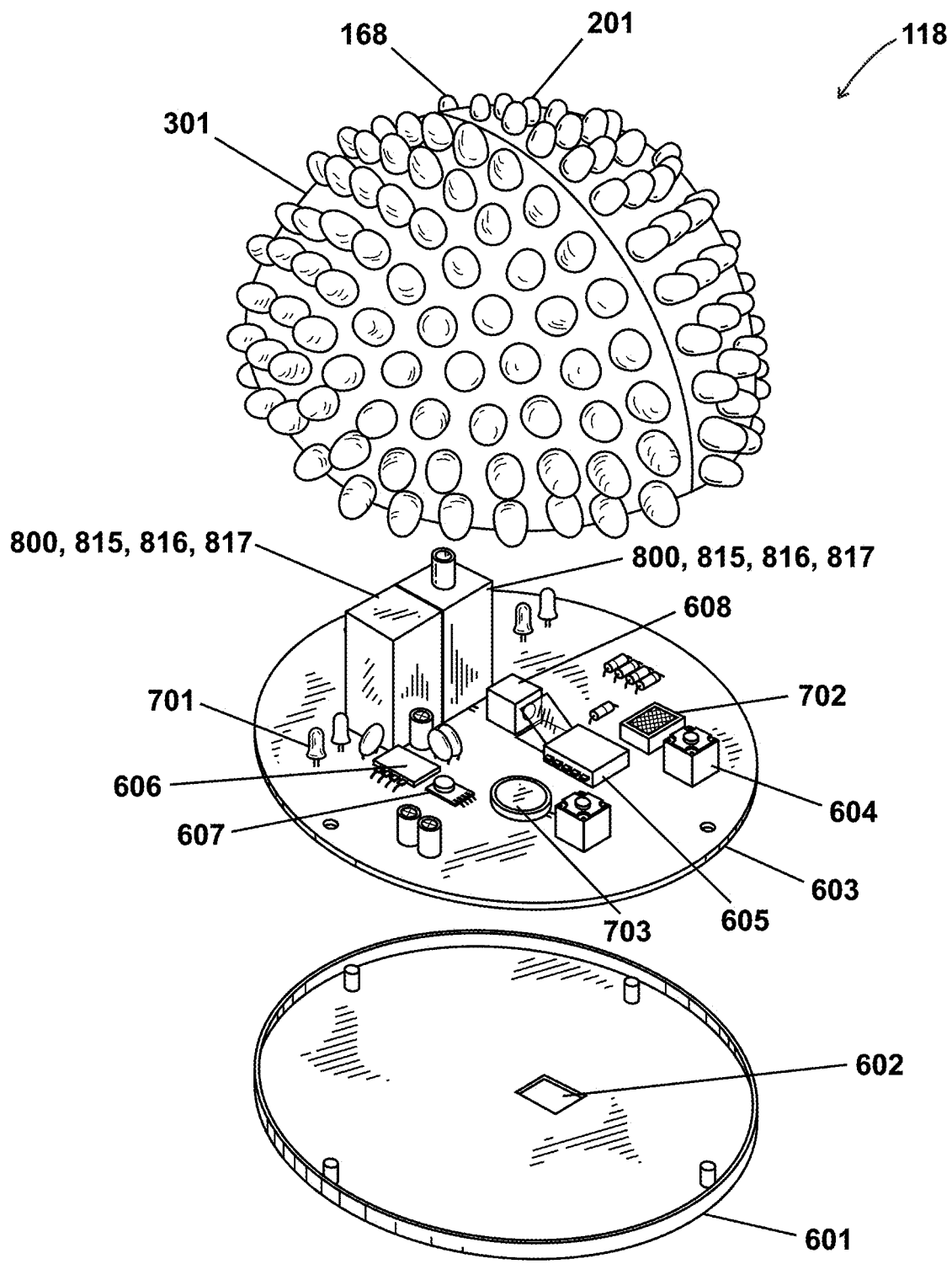

FIGS. 16 and 17 are exploded views showing cursor control devices 115,116,117,118 that are similar to cursor control device 114 of FIG. 15. FIG. 16 shows a sensory stimulator that can include an edible film dispenser/label/sticker dispenser 815, a bubble generating device 816, and a scent dispensing device 817. The sensory stimulator is attached to the board 603 and operably connected to the processor 605,606. FIG. 17 shows a cursor control device 118 similar to cursor control device 115,116,117 with two sensor stimulators attached to the board 603 and operably connected to the processor 605,606. The two sensor stimulators of control device 118 can include an edible film dispenser/label/sticker dispenser 815, a bubble generating device 816, and a scent dispensing device 817.

Figure 18:
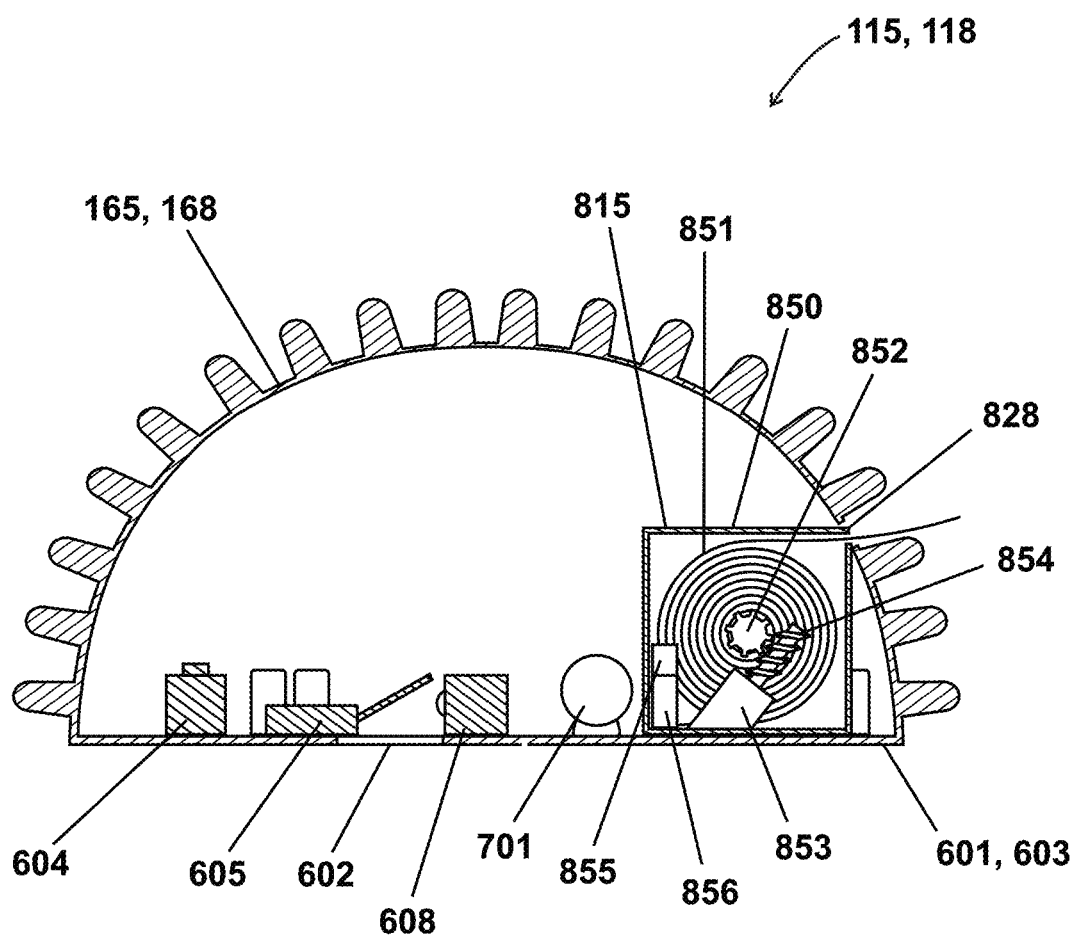
FIGS. 18, 19, and 20A are cross sectional views showing cursor control devices of various embodiments.

FIG. 18 is a cross sectional view showing cursor control devices 115, 118 having an edible film dispenser/label/sticker dispenser 815. The edible film dispenser/label/sticker dispenser 815 has a housing 850 and a roll 851 of stickers or films positioned within the housing 850. The roll 851 has a gear 852 attached on a side of the roll 851. The gear 852 is capable of being operably connected to a worm drive 854 attached to a motor 853 such as an electric motor. In operation, the motor 853 is capable of rotating the roll 851 such that stickers or films exit the housing 850 and the through the opening 828 of the housing 165 of the cursor control devices 115, 118. The motor 853 is operably connected to a controller 856 and powered by a battery 855. The controller 856 can be operably connected to the processor 605,606. The stickers or films can include stickers and films disclosed in U.S. Application Publication No. 2014/0105958 and U.S. Pat. No. 4,283,011, which are both incorporated herein by reference. The edible film dispenser/label/sticker dispenser can also be the dispenser disclosed in U.S. Patent Application Publication No. 2003/0071051 and U.S. Pat. No. 4,283,011, which are which are both incorporated herein by reference.

Figure 19:
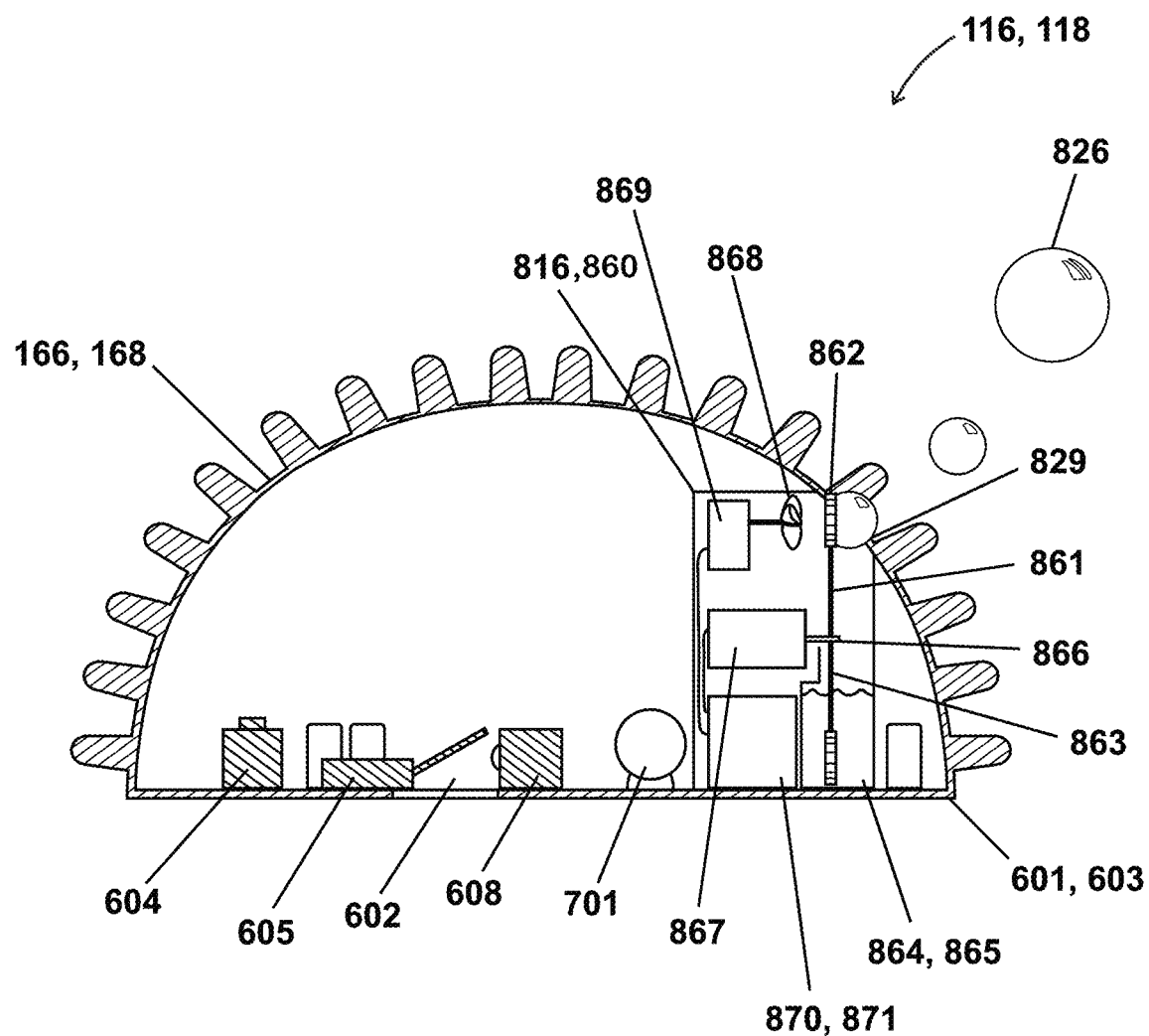

FIG. 19 is a cross sectional view showing cursor control devices 116,118 having a bubble generating device 816. The bubble generating device 816 has a housing 860 with a reservoir 864 position at the bottom of the housing 860 capable of holding a bubble solution 865. A rotatable wand 861 with a plurality of bubble rings 862 attached to a rotor 866 via a plurality of arms 863 is positioned in the housing 860 such that the wand 861 can rotate in a manner to allow the plurality of bubble rings 862 to be submerged within the bubble solution 865. The rotor 866 is driven by a motor 867. A fan 868 attached to a motor 869 is positioned above motor 867 such that the fan 868 is able to direct air through a bubble ring 862 having a film of the bubble solution 865 such that a bubble 826 is able to form. Alternatively, the fan and rotor can be rotated with one motor. The fan 868 is also capable moving air with a velocity sufficient to separate the bubble 826 from the bubble ring 862 and through the opening 829 in the housing 166,168 of cursor control devices 116,118. The motors 867,869 are operatively connected to a controller 870 and powered by a battery 871. The controller 870 can be operably connected to the processor 605,606. The bubble generating device of various embodiments can also be or be similar to the devices disclosed in Foreign Patent Publication No. EP0189263; U.S. Pat. Nos. 4,995,844 and 6,200,184; U.S. Patent Application Publication No. 2011/0081821; and PCT Patent Application Publication No. WO 03/037472, which are all incorporated herein by reference.

Figure 20A:
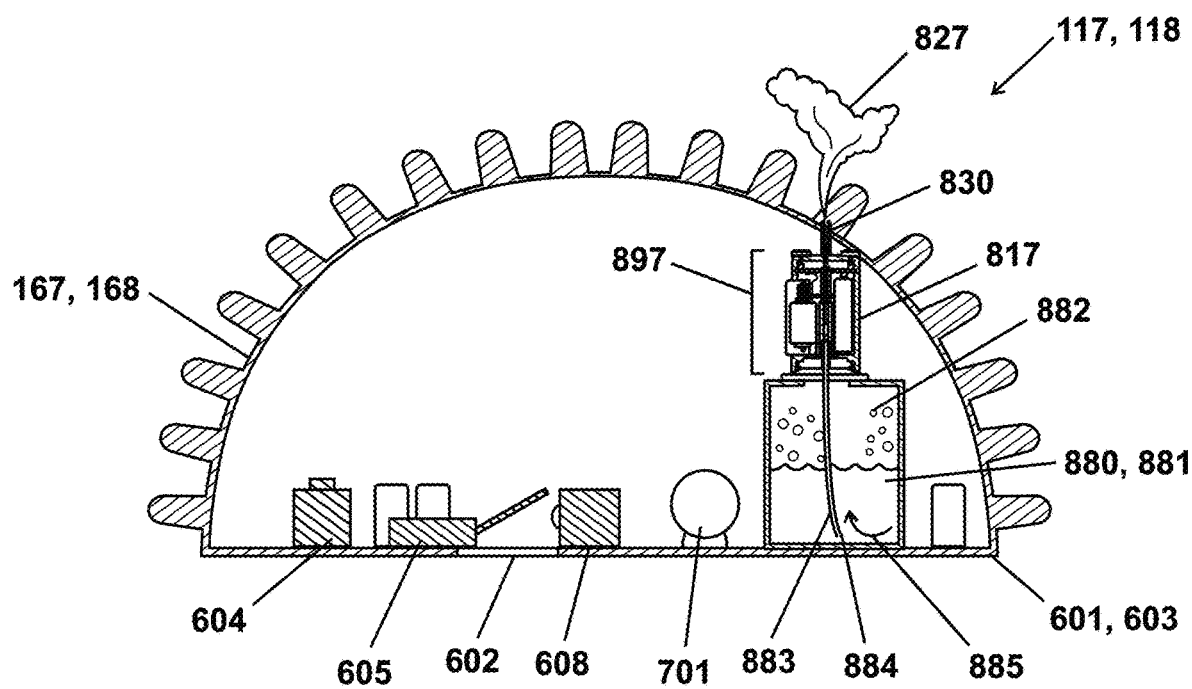

FIG. 20A is a cross sectional view showing cursor control device 117,118 having a scent dispensing device 817 positioned within the cursor control device 117,118, where the scent dispensing device 817 extends through an opening 830 in the housing 167,168. The scent dispensing device of various embodiments is the dispenser as shown in FIGS. 1-9 of U.S. Pat. No. 6,540,155, which is incorporated by reference. The scent dispensing device 817 has a reservoir 880 containing a scented liquid 881 and a compressed gas 882. Alternatively, the reservoir 880 can contain a liquid propellant combined with a scented material and a propellant vapor. Tubing 883 is positioned within the reservoir 880 such that the scented liquid 881 can enter 885 an inlet 884 of the tubing and flow through the tubing 883. The tubing 883 extends out of the reservoir 880 into a bottom bolt 894 having a bore of the scent dispensing element 897.

Figure 20B:
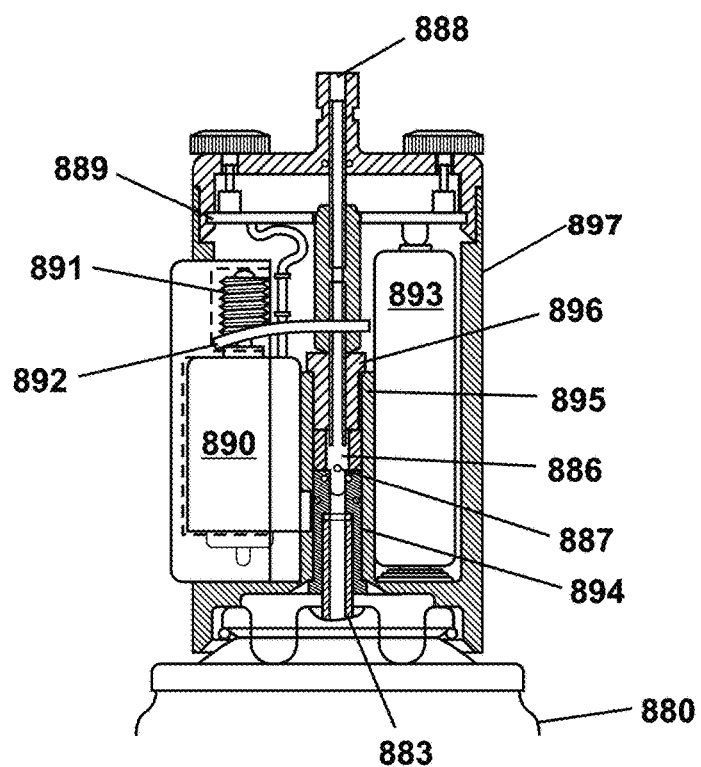
FIG. 20B is a cross sectional view of a scent dispensing element of various embodiments.

FIG. 20B is a cross sectional view of a scent dispensing element 897 having the bottom bolt 894, a middle bolt 895 with a bore, and a top bolt 896 with a bore. A middle bolt 895 with a bore is positioned on top of the bottom bolt 894 such that the bore of the middle bolt 895 is connected to the bore of the bottom bolt 894. The bore of the middle bolt 895 has a diameter that is greater than the bore of the bottom bolt 894. The top bolt 896 with a bore is positioned above the middle bolt 895. A shaft 886 with a channel is inserted through and past the bore of top bolt 896. The shaft 886 also has a diameter that is capable of sealing the bore of the bottom bolt 894 and has an opening 887 into the channel positioned on the side of the shaft 886. The top bolt 896 is operably connected to a lever 892 and is movable to a closed position where the shaft 886 extends into the bore of the bottom bolt 894 similar to a plunger and prevents flow of the scented liquid 881 through the channel of the shaft 886. The top bolt 896 is also movable to an open position where the shaft does not extend in to the bore of the bottom bolt 894 and the opening 887 of the shaft 886 is positioned the bore of the middle bolt 895. In the open position, the scent liquid 881 flows from the tubing 883, through the bores of the bottom 894 and middle 895 bolts and into the channel of the shaft 886 through the opening 887. The scented liquid 881 exits the channel of the shaft 886 through the outlet 888. The lever 892 is operable connected to a screw drive 891 driven by a motor 890. The motor 890 is powered by a battery 893 and operatively connected to a controller 889. The controller 889 can be operably connected to the processor 605,606. The scent dispensing device of various embodiments can also be or be similar to the dispenser disclosed in U.S. Pat. Nos. 6,644,507; 7,798,424; 8,050,545; PCT Patent Application Publication No. WO 2014/182337 and WO 2016/130937, which are all incorporated herein by reference.

In various embodiments, the sensory stimulator can be at least one of an edible film dispenser, a label dispenser, a scent dispensing device, a bubble generating device, and a keyboard capable display illuminations, emitting sounds, or vibrating.

In various embodiments, the cursor control device further comprises a second sensory stimulator selected from the group including at least one of a sound generator, light generator, and vibration device, where the second sensory stimulator is positioned within or on the housing and is configured to provide a second sensory stimuli.

In alternative embodiments are disclosed a cursor control device comprising a housing; a sensor positioned within the housing and configured to generate data for translating motion and position of the cursor control device to move and position a cursor on a display screen of the computer or other electronic device; at least three sensory stimulators positioned within the housing, wherein each sensory stimulator is capable of stimulating a different sensory stimulus to a user; and a processor positioned within the housing and capable of commanding the at least three sensory stimulators to generate the different sensory stimulus. In various embodiments, at least one of the at least three sensory stimulators of cursor control device of alternative embodiments is selected from the group including at an edible film dispenser; a label dispenser; a scent dispensing device; a bubble generating device; and a keyboard capable display illuminations, emitting sounds, or vibrating. In various embodiments, the other of the at least three sensory stimulators of cursor control device of alternative embodiments can include a sound generator, light generator, and vibration device.

In various embodiments are disclosed a cursor control device for a computer or other electronic device, the cursor control device comprising: a housing; a sensor positioned within the housing and configured to generate data for translating motion and position of the cursor control device to move and position a cursor on a display screen of the computer or other electronic device; and a sensory stimulator positioned within or on the housing and configured to provide a sensory stimulus to a sense of smell or taste of a user or to generate bubbles. The sensory stimulator of various embodiments can be selected from the group including at least one of an edible film dispenser, a label dispenser, a scent dispensing device, and a bubble generating device.

In various embodiments, the sensor stimulator is a plurality of sensor stimulators including a first sensor stimulator configured to provide a sensory stimulus to the sense of smell or taste of the user or to generate bubbles a second sensory stimulator configured to provide a sensory stimulus to the other of the sense of smell or taste of the user or to generate bubbles. The plurality of sensor stimulators of various embodiments can further include at least one of a sound generator, light generator, and vibration device.

In various embodiments, the cursor control device includes a transceiver for sending data to and receiving data from the computer or other electronic device or commanding the sensory stimulator to generate the sensory stimulus or bubbles.

In various embodiments, the cursor control device includes a processor capable of commanding the sensory stimulator to generate the sensory stimulus or bubbles. The processor of various embodiments can also execute a utility on the computer or other electronic device, where execution of the utility generates an interactive interface on a display screen of the computer or other electronic device.

In various embodiments are disclosed an interactive computing device including: a display screen; an interactive utility; a processor capable of executing the interactive utility, where execution of the interactive utility generates an interactive interface on the display screen; an external input device operably connected to the processor and configured to allow a user to interact with the interactive interface; and a plurality of external sensory stimulators capable of generating sensory stimuli outside of the display screen for stimulating at least three senses of a user, wherein at least one of the processor and input device is capable of commanding the sensory stimulator to generate the sensory stimulus. In other embodiments, the interactive computing device is capable of stimulating at least four or five senses of a user. The stimulation of the different senses by the interactive computing device of various embodiments can be accomplished substantially simultaneously or simultaneously. In various embodiments, interaction by the user with the interactive interface is capable of commanding at least one of the plurality of external sensory stimulators via the processor to generate a sensory stimulus.

In various embodiments, the sense of a user that are stimulated include, for example, sight, touch, smell, hearing, or taste.

Figure 21:
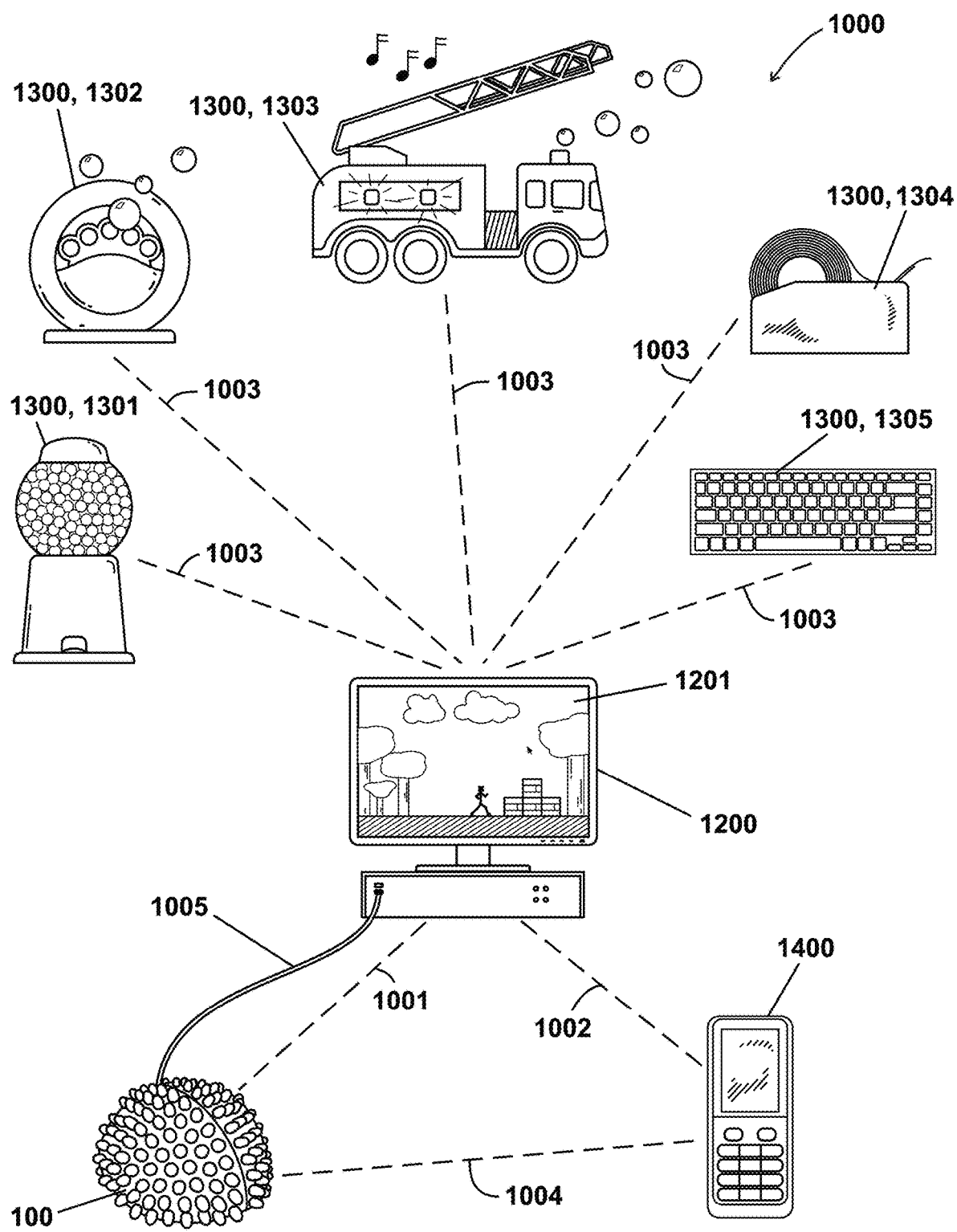
FIGS. 21, 23A, and 24 are schematic views showing interactive computing devices of various embodiments.

FIG. 21 is a schematic view showing interactive computing device 1000. The interactive computing device 1000 includes a computer or electronic device 1200 with a display screen 1201 wirelessly or directly connected 1001 to cursor control device 100. The computer or electronic device 1200 is capable of being connected 1003 to a sensory stimulator 1300 such as, for example, wirelessly connected to a treat dispenser 1301, a bubble generating device 1302, a light/sound/bubble generating device 1302 (e.g. a Bump 'N' Go Bubble Vehicles or a Light & Sound Fire Truck Bubble Blaster), an edible film dispenser/label/sticker dispenser 1304, or an illuminated keyboard 1305. The computer or electronic device 1200 is also capable of being connected 1002 to a second electronic device 1400, such as, for example, a mobile electronic device (i.e. smart phone).

The computer or electronic device 1200 with a display screen 1201 can include other type devices such as smart televisions or tablets. In various embodiments, the computer or electronic device 1200 is capable of controlling the operation of the sensory stimulator 1300 or cursor control device 100. The computer or electronic device 1200 in other embodiments is also able to control some functions of the second electronic device 1400.

The second electronic device 1400 of various embodiments is capable of connecting to 1004 and controlling the functions of the sensory stimulator 1300 or cursor control device 100. The second electronic device 1400 in other embodiments is also able to control some functions of the computer or electronic device 1200.

Cursor control device 100 can include any cursor control device of any embodiment and could include other devices 2100,2150 aiding a user with a physical and/or mental disability such as:

A system or device similar to AbleNet's Impulse system that replaces a traditional keyboard and mouse. The system includes a disposable electrode sensor that sticks to the skin and a bluetooth transmitter on top of the electrode, where software installed on computer interprets input from a user and carries out the commands.

A system or device similar to LC Technologies' Eyegaze Edge system that uses a high-speed infrared camera mounted under the system's monitor and a small external processing unit to translate eye motion into on-screen action.

A system or device similar to Semco's Jouse 2 joystick allowing a user to control the text cursor and enter individual letters, numbers and punctuation by combining sips and puffs of air.

A system or device similar to NaturalPoint's SmartNav 4:AT that includes an infrared scanner that sitting on top of a monitor or notebook and that works by sensing a small reflective dot that can be stuck to the forehead of a user, eyeglass frames, hat or headset's microphone.

A system or device similar to a light operated mouse and keyboard, where the system uses a head-mounted device that shoots a laser beam to a keyboard.

A system or device similar to Hunter Digital's NoHands Mouse using oval-shaped pedals with a thin foot platform that senses 360 degrees of movement and varying amounts of pressure.

A system or device similar to Greystone Digital's Big-Keys LX incorporating a keyboard having 1 inch squares that aid an individual with poor eyesight of hand-eye coordination.

A system or device that allows for increasing the size of text on a display screen.

A system or device similar to WizCom Technologies' InfoScan TS Elite scanning pen that allows a user to scan and store printed material and reader that reads the scanned material out loud to the user.

A system or device similar to American Printing House's Braille+ Mobile Manager and BrailleNote Apex that has a Perkins-style Braille keyboard and a voice recorder.

A system or device similar to Ginger Labs' soundAMP software that can amplify word and filter out background noise.

The sensory stimulator 1300 is preferably an external sensory stimulator that is separate from the computer 1200, 2200.

The interactive computing device 1000 can operate in a manner similar to or the same as U.S. Pat. No. 8,997,009, which is incorporated by reference.

Figure 22A:
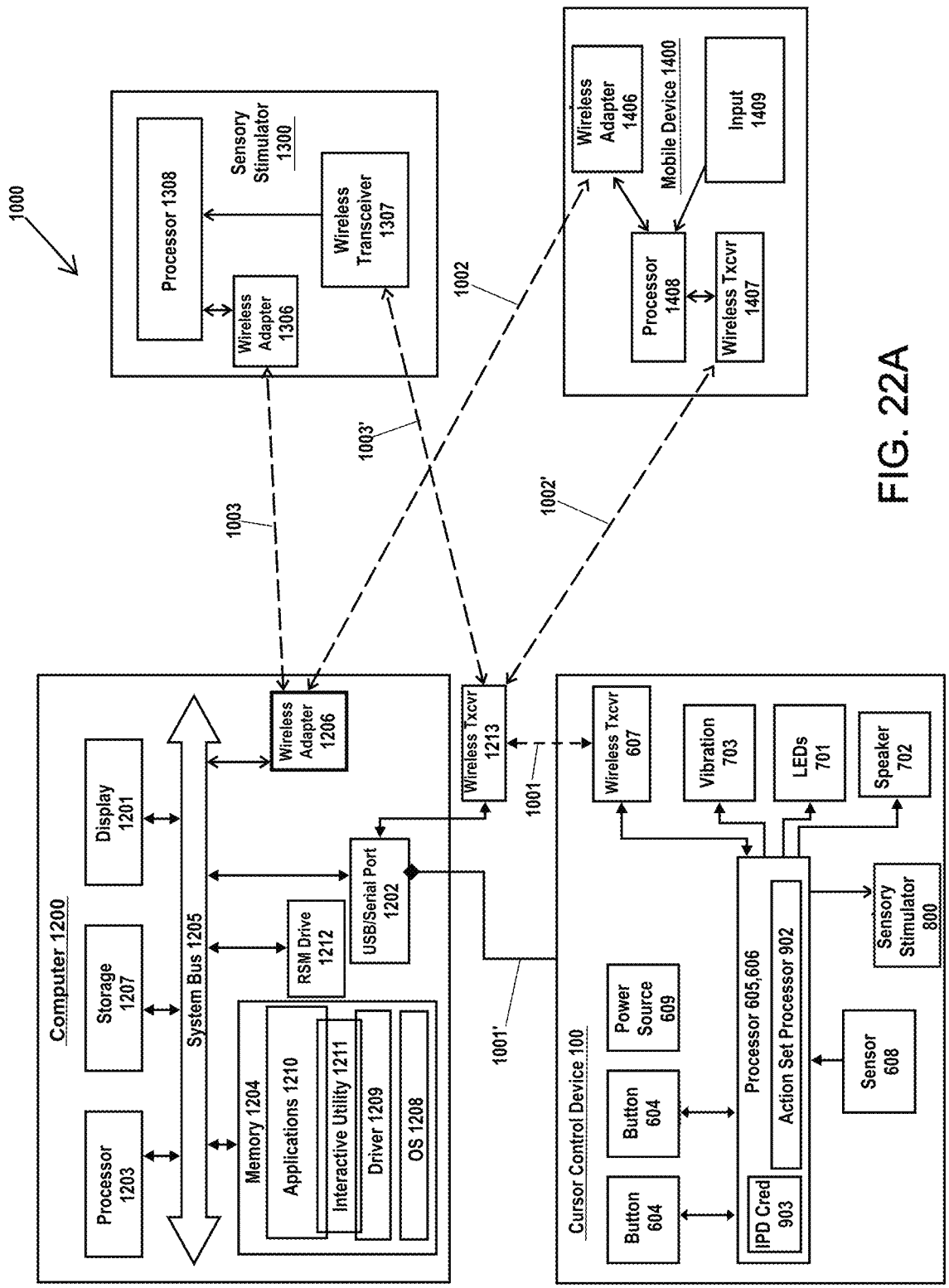
FIGS. 22A and 25A are block diagrams of interactive computing devices of various embodiments.

FIG. 22A is a block diagram of an example of interactive computing device 1000 illustrating internal components of a computer 1200 and a connected cursor control device 100, where the cursor control device 100 includes a sensory stimulator 700,800. The cursor control device 100 of various embodiments includes processors 605,606 capable of receiving input from the micro-switches 604 and a sensor 608 (e.g. LED and prism). Sensor 608 provides positional location tracking and movement tracking for cursor control device 100 and continually transmits any detected/sensed movement of the cursor control device 100 to the computer 1200 via a wireless transceiver 607 or wired connection connected to a port 1202 of the computer 1200. Movement of cursor control device 100 similarly moves a cursor viewable by a user on display 1201 of computer 1200. Sensor 608 may use any combination of one or more mechanical, optical, laser, or sensor arrays to track movement and positioning of cursor control device 100.

The processors 605,606 include an action set processor 902 to detect and correctly respond to movement of the cursor control device 100 including depression, selection, or manipulation of any one of the micro-switches 604 coupled to the first or second sections of the housing of the cursor control device 100. The processors 605,606 also includes identifying credentials 903 that can be transmitted to the computer 1200 during one or more initial connections of the cursor control device 100 to the computer 1200.

The processors 605,606 are operatively connected to a sensory stimulator 700 including LEDs 701, sound generators 702, and vibration devices 703. The processors 605,606 are also operatively connected to a sensory stimulator 800 including an edible film dispenser 815, bubble generating device 816, and a scent dispensing device 817. The responses by the sensor stimulator 700,800 can be generated in response to an action or function performed using the cursor control device 100 or in response to a change or function occurring within the computer 1200 and/or the software currently executing within the computer 1200.

The cursor control device 100 may be a wired or wireless device and can include a wireless transceiver (e.g. RF or Bluetooth module) 1213 to facilitate wireless connection with the computer 1200. In other embodiments, the cursor control device 100 has a wired connection 1001' connected to the USB/Serial Port 1202 of the computer 1200. The cursor control device 100 can also have a power source 609 such as a battery that powers the cursor control device 100.

The computer 1200 includes a processor 1203 coupled to memory 1204 through a system bus 1205 the provides communication with various components of computer 1200. The computer includes a USB/Serial port 1202, a wireless adapter 1206, and storage 1207, each of which is also coupled to system bus 1205. The cursor control device 100 can be directly connected 1001' to the USB/Serial port 1202. The computer 1200 can also include other types of input/output device and a wireless transceiver 1213 that can be coupled to the USB/serial port 1202 and can wirelessly connect 1001, 1002',1003' to the cursor control device 100, sensory stimulator 1300, or second electronic device 1400. The wireless adapter 1206 can also be used to wirelessly connect 1002,1003 to the sensory stimulator 1300 or second electronic device.

The wireless transceiver 1213 can include its own firmware to enable the wireless transceiver 1213 to operate as a plug-and-play device. Similarly, in one embodiment, processors 605,606 can also include its own internally stored firmware/software that enables cursor control device 100 to be a plug-and-play device.

The wireless adapter 1206 enables computer 1200 to connect 1002,1003 via an external network to other input/output devices such as a sensory stimulator 1300 or other electronic device 1400.

In addition to the above described hardware components, computer 1200 also comprises a number of software and/or firmware components. Thus, illustrated within memory 1204 are example software, firmware and/or logic components, including operating system (OS) 1208, a driver 1209 for the cursor control device 100, and applications 1210. OS 1208 provides a user access to resources such as applications 1210. The OS 1208 through the driver 1209 enables use the cursor control device 100 to be used with the computer 1200 with the different applications 1210.

The computer 1200 also includes an interactive utility 1211 that is operated by the OS 1208. Among the software provided is interactive utility 1211, which is illustrated as being a software component within one or both of applications 1210 and driver 1209. Depending on the manner in which interactive utility 1211 is distributed to an end user, interactive utility 1211 can be packaged as a sub-routing within driver 1209 or interactive utility 1211 can also be provided as a separate application, purchased with or separate from driver 1209, as an enhancement to the usage of cursor control device 100 with computer 1200. Interactive utility 1211 may be installed on computer 1200 via removable storage drive 1212, transferred directly from cursor control device 100 or from wireless transceiver 1213 upon connection of either device, or in another embodiment may be downloaded from an external server through the wireless adapter 1206.

The OS 1208 when executing the interactive utility 1211 attempts to connect with the cursor control device 100, sensor stimulator 1300, and other electronic device 1400. The computer 1200 is capable of connecting with the wireless adapter 1306,1406 or the wireless receiver 1307, 1407 of the sensor stimulator 1300 or other electronic device 1400. When connected, the interactive utility 1211 is capable receiving and transferring data 1001,1001',1002, 1002',1003,1003' to the cursor control device 100, sensor stimulator 1300, and other electronic device 1400.

The interactive utility 1211 as executed by the OS 1208 displays an interface on the display screen 1201 where the interactive utility 1211 is also an interactive educational game such as a videogame.

Through the interactive utility 1211, a user engages a cursor control device 100 to move a cursor and select options on the display screen 1201. When a particular option is selected, the interactive utility 1211 trigger the processors 605,606 to activate the sensory stimulator 700,800 to generate a sensory stimulus or a processor 1308 of the sensory stimulator 1300 to generate a sensory stimulus. For example, the interactive utility 1211 can be a math videogame, where a sensory stimulus is generated when a user selects a correct question. The processor 1308 of the sensory stimulator 1300 is connected to the wireless adapter 1306 or transceiver/receiver 1307 such that the processor receives the commands from the interactive utility through the wireless adapter 1306 or transceiver/receiver 1307.

The other electronic device 1400 also includes a processor 1408 that is connected to the wireless adapter 1406 or transceiver 1407. When connected to the computer, the processor 1408 is capable of receiving input 1409 from a user to control the function of the cursor control device 100.

Figure 22B:
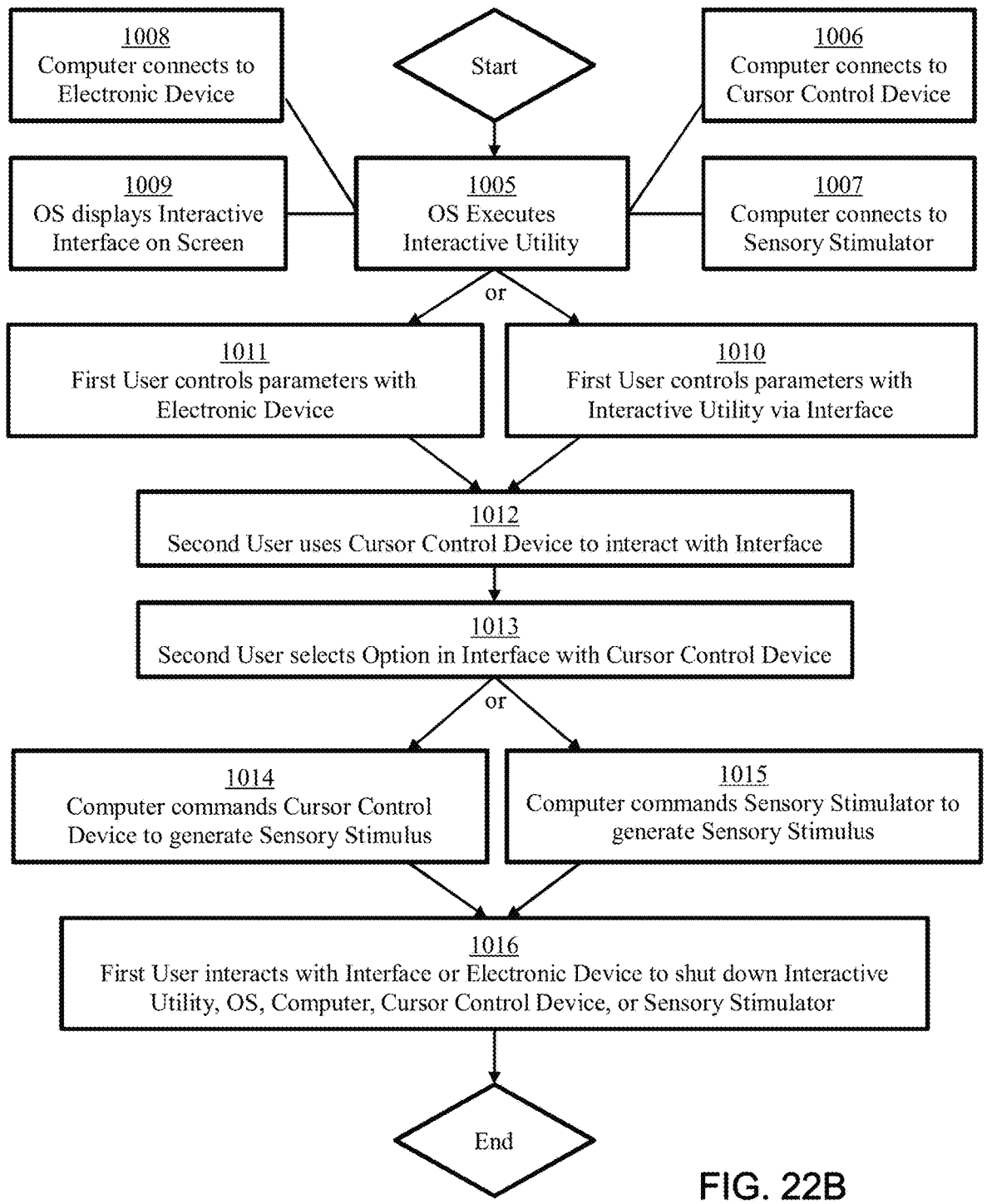
FIGS. 22B, 23B, and 25B are flow charts of interactive computing devices of various embodiments.

FIG. 22B is a flow chart of the of interactive computing device 1000. In step 1005, the OS 1208 executes the interactive utility 1211, where the computer 1200 connects to cursor control device 11 (step 1006), sensory stimulator 1300 (step 1007), and electronic device 1400 (step 1008). The OS 1208 also displays the interactive interface on the display screen 1201 (step 1009).

In step 1010, a first user can use the interactive utility 1211 to control the operational parameters of the computer 1200, cursor control device 100, or sensory stimulator 1300. The operational parameters include, for example, turning on/off or modifying the operation (i.e. sensory stimulus or interface) of the computer 1200, cursor control device 100, or sensory stimulator 1300. In step 1011, the first user can also use the electronic device 1400 to control the computer 1200, cursor control device 100, or sensory stimulator 1300.

In step 1012, a second user engages the cursor control device 100 to interact with the interface on the display screen 1201. The second user is step 1013 selects an option on the interface, where the computer 1200 in step 1014 commands the cursor control device to generate a sensory stimulus or in step 1015 commands the sensory stimulator to generate a stimulus.

In step 1016, the first user can interact with the interactive utility 1211 or electronic device 1400 to shut down the utility 1211, OS 1208, computer 1200, sensory stimulator 1300, or cursor control device 100.

In various embodiments are disclosed a product packaged for sale including a cursor control device 100 having an interactive utility for installation on a computer and executable by an operating system.

Figure 23A:
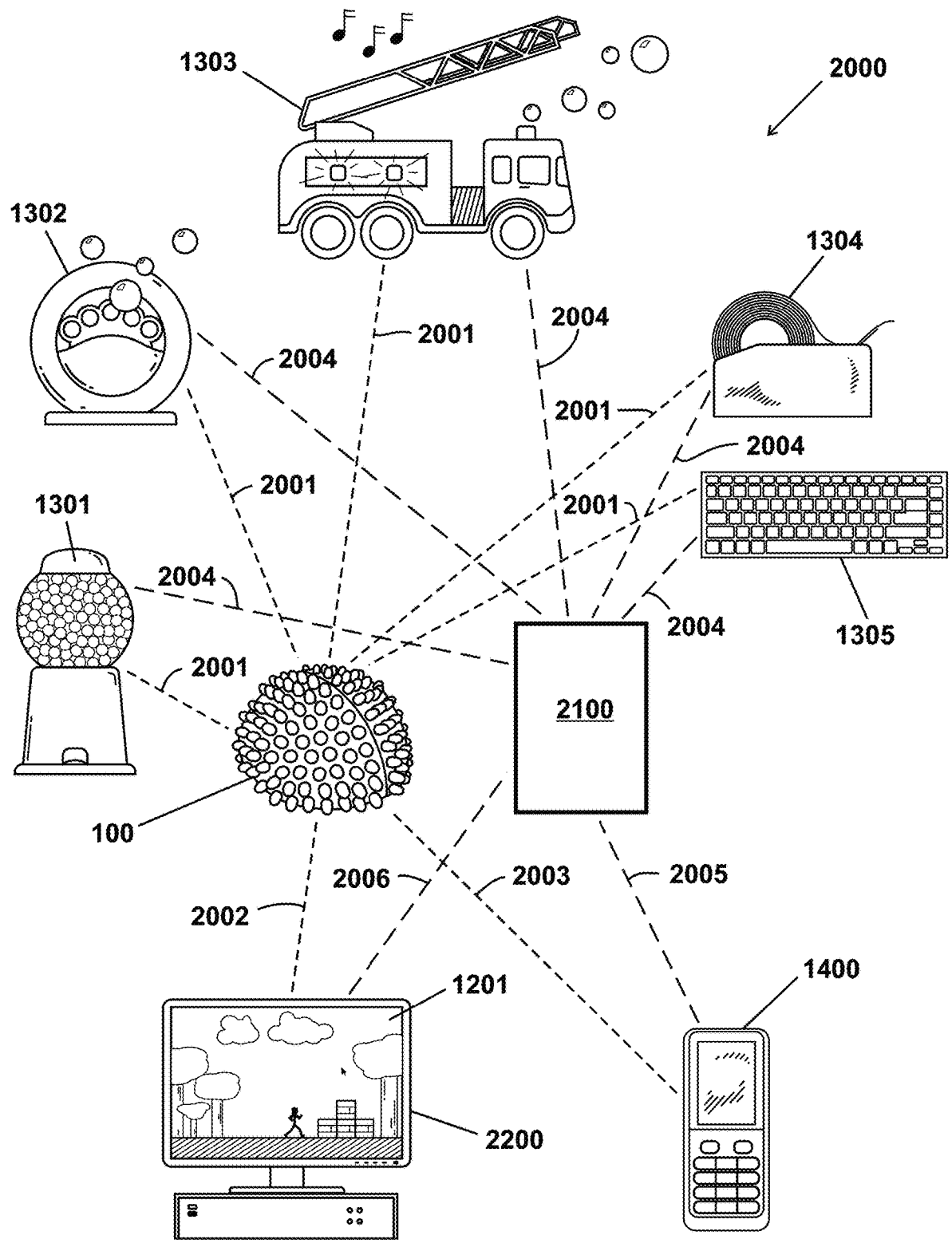

FIG. 23A is a schematic view showing interactive computing device 2000. Interactive computing device 2000 includes cursor control device 100 or an external input device 2100 that is capable of connecting 2001, 2004 with an external sensory stimulator 1300. The cursor control device 100 or an external input device 2100 is also capable of connecting 2002,2006 to a computer 2200 or connecting 2003,2005 to an other electronic device 1400. The processor of the cursor control device 100 or an external input device 2100 preferably executes the interactive utility. The cursor control device 100 or an external input device 2100 can include its own firmware to enable the cursor control device 100 or an external input device 2100 to operate as a plug-and-play device.

Figure 23B:
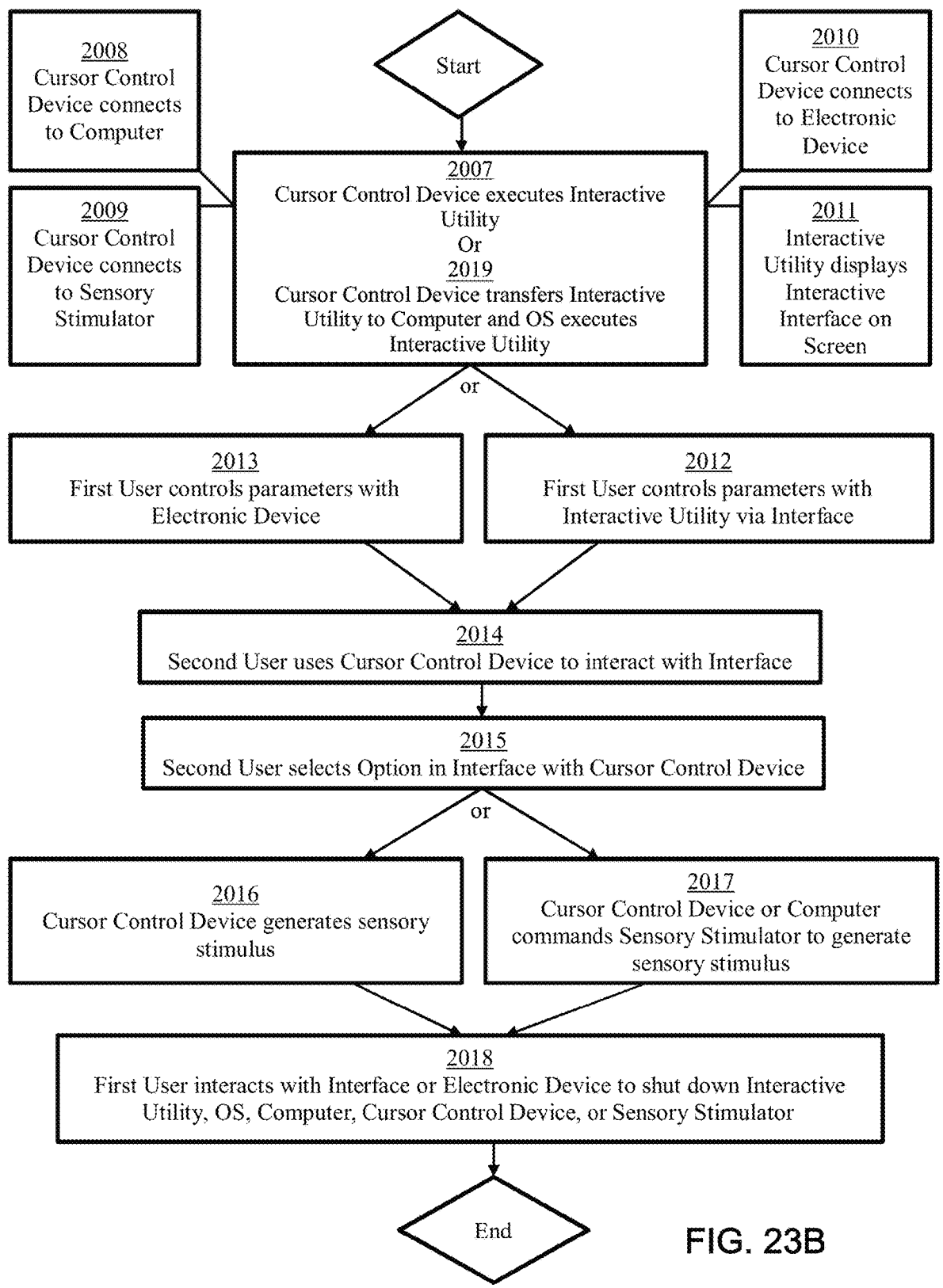

FIG. 23B is a flow chart of the of interactive computing devices 2000. In step 2007, the processor of the cursor control device 100 or an external input device 2100 executes the interactive utility, where the cursor control device 100 or an external input device 2100 connects to the computer 2200 (step 2008), sensory stimulator 1300 (step 2009), and electronic device 1400 (step 2010). The interactive utility also displays the interactive interface on the display screen 1201 of the computer 1200 (step 2011). In step 2019, the cursor control device 100 or an external input device 2100 can also can transfer the interactive utility to the memory 1204 of the computer 2200 and install the interactive utility as interactive utility 1211 that can be executed by the OS 1208.

In step 2012, a first user can use the interactive utility to control the operational parameters of the computer 2200, cursor control device 100 or an external input device 2100, or sensory stimulator 1300. The operational parameters include, for example, turning on or off or modifying the operation (i.e. sensory stimulus or interface) of the computer 2200, cursor control device 100 or an external input device 2100, or sensory stimulator 1300. In step 2013, the first user can also use the electronic device 1400 to control the computer 2200, cursor control device 100 or an external input device 2100, or sensory stimulator 1300.

In step 2014, a second user engages the cursor control device 100 or an external input device 2100 to interact with the interface on the display screen 1201. The second user is step 2015 selects an option on the interface, where the cursor control device 100 or an external input device 2100 in step 2016 generates a sensory stimulus or in step 2017 commands the sensory stimulator 1300 to generate a stimulus.

In step 2018, the first user can interact with the interactive utility 1211 or electronic device 1400 to shut down the cursor control device 100, external input device 2100, computer 2200, or sensory stimulator 1300.

In various embodiments are disclosed a product packaged for sale including a cursor control device 100 having an executable interactive utility.

Figure 24:
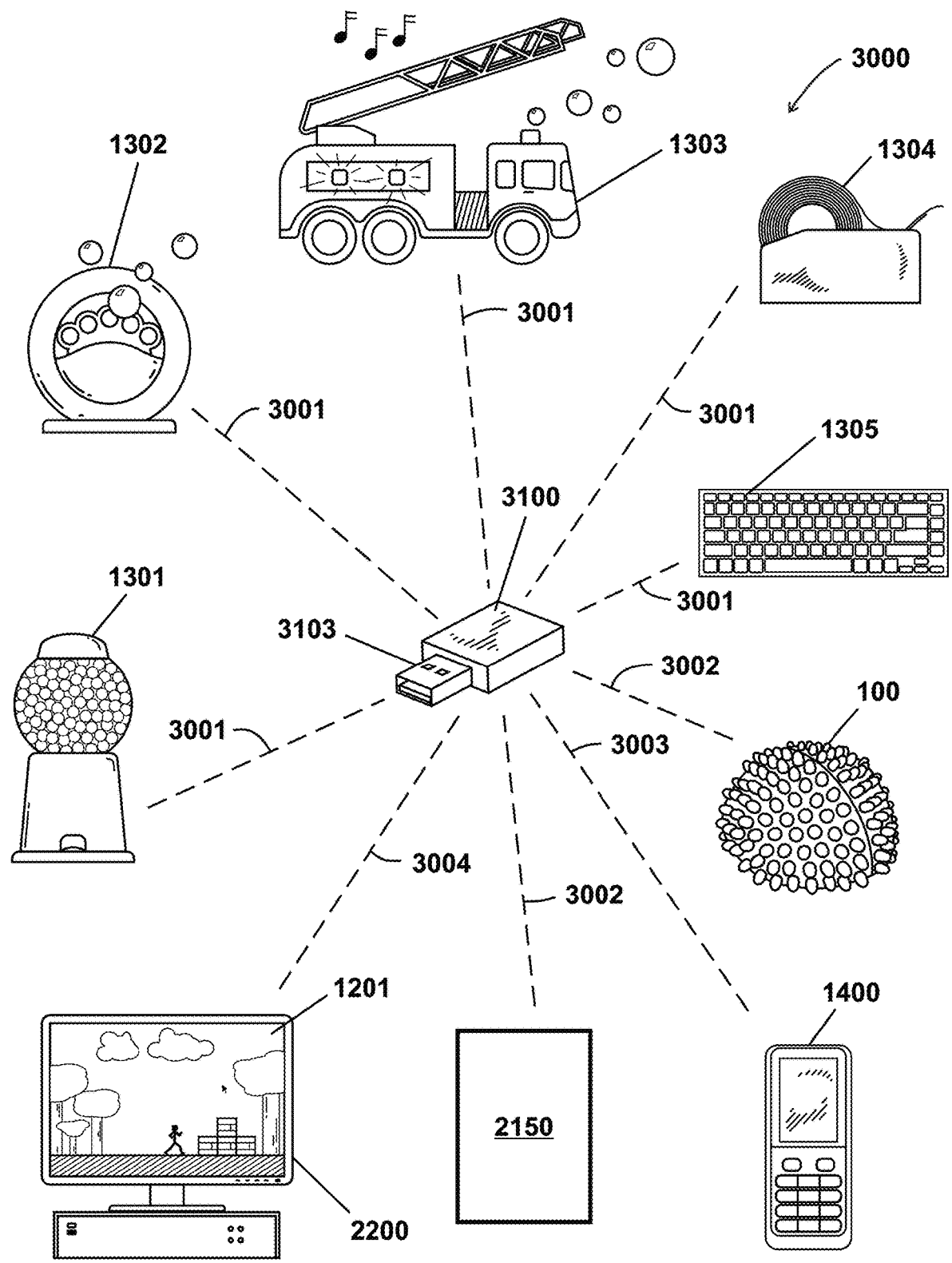

FIG. 24 is a schematic view showing interactive computing device 3000. Interactive computing device 2000 includes dongle 3100 that is capable of connecting 3002 to a cursor control device 100 or an external input device 2150 or capable of connecting 3108 with an external sensory stimulator 1300. The dongle 3100 is also capable of connecting 3003,3004 to a computer 2200 or an other electronic device 1400. The dongle 3100 preferably has a processor capable of executing the interactive utility and can include its own firmware to enable the dongle 3100 to operate as a plug-and-play device.

Figure 25A:
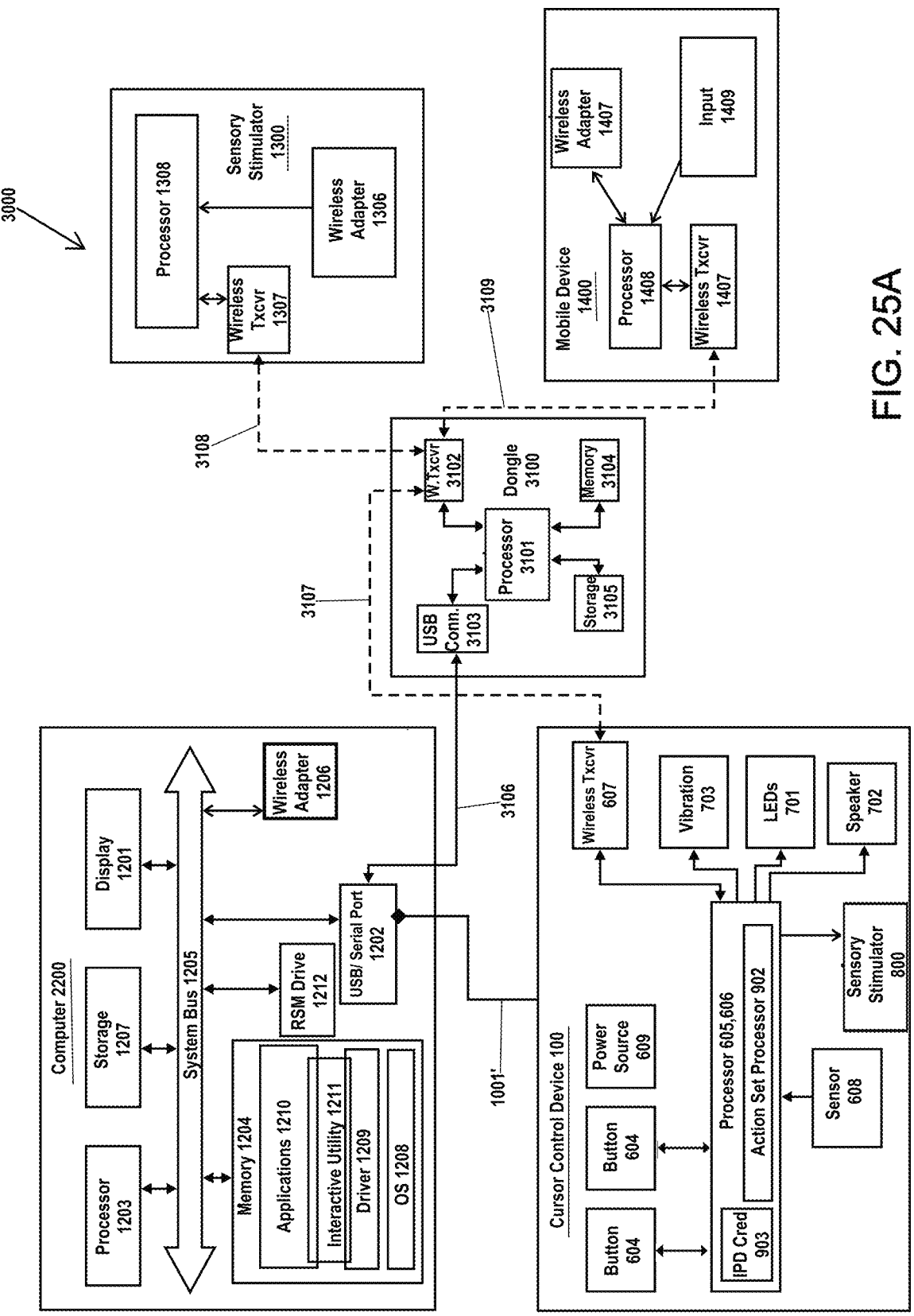

FIG. 25A is a block diagram of an example of interactive computing device 3000. Interactive computing device 3000 is similar to interactive computing device 1000 and further includes a dongle 3100 capable of being connected 3106 to a computer 2200 and wirelessly connected to the cursor control device 100, sensory stimulator 1300, and other electronic device 1400. In various embodiments, the dongle is similar to or is the devices disclosed in U.S. Pat. Nos. 6,941,114; 8,520,697; 8,275,082; 9,384,604; 9,584,502; 9,635,412, which are all herein incorporated by reference.

The dongle 3100 has a male end connector 3103 that directly connects 3107 to the USB/serial port 1202 of computer 2200. The male end connector 3103 is operatively connected to a processor 3101, where data can be received from or transferred to the computer 2200. The dongle 3100 also has a transceiver 3102 that is also operatively connected to the processor 3101. The transceiver 3102 can have RF or Bluetooth capabilities allowing for connections 3107,3108, 3109 with the cursor control device 100, sensory stimulator 1300, and other electronic device 1400. In particular, the transceiver 3102 is capable of wirelessly connecting 3107, 3108,3109 to the transceivers 607,1306,1307 of the cursor control device 100, sensory stimulator 1300, and other electronic device 1400. The connection 3107,3108,3109 between the transceivers 607,1306,1307, 3102 allows for the transfer of data between the dongle 3100, cursor control device 100, sensory stimulator 1300, and other electronic device 1400.

The dongle 3100 also has memory 3104 and storage 3105 components connected to the processor 3101. The memory 3104 or storage 3105 components can include an operating system that is executed by the processor 3101 and an interactive utility that can be executed by the operating system run by the processor 3101. Alternatively, the processor 3101 can transfer the interactive utility and install the interactive utility as interactive utility 1211 that can be executed by the OS 1208.

In various embodiments, the processor 3101 is capable of commanding the sensory stimulators 700,800,1300 to generate a sensory stimulus.

Figure 25B:
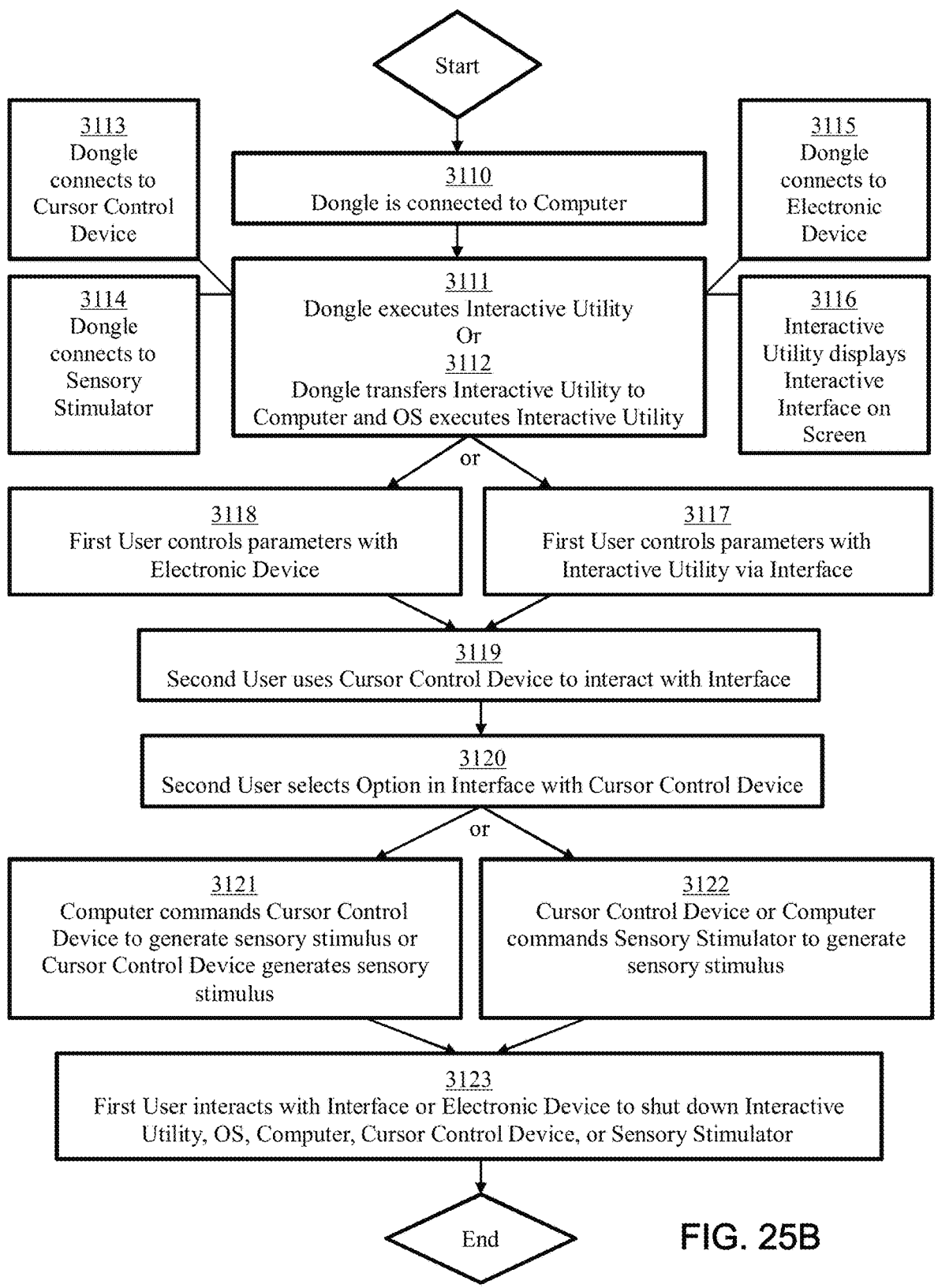

FIG. 25B is a flow chart of the of interactive computing devices 3000.

In step 3110, a user connects 3106 the dongle 3100 to the computer 2200. The processor 3101 of the dongle is able to execute an interactive utility stored in the memory 3104 or storage components (3111) or is able to transfer the interactive utility to be installed in the memory 1204 (3112), where the OS executes the interactive utility as interactive utility 1211.

In executing the interactive utility or interactive utility 1211, the dongle 3100 connects 3107,3108,3109 to the cursor control device 100 or an external input device 2150 (step 3113), sensory stimulator 1300 (step 3114), and electronic device 1400 (step 3115). The interactive utility also displays the interactive interface on the display screen 1201 of the computer 2200 (step 3116).

In step 3117, a first user can use the interactive utility to control the operational parameters of the computer 2200, cursor control device 100 or an external input device 2100, or sensory stimulator 1300. The operational parameters include, for example, turning on or off or modifying the operation (i.e. sensory stimulus or interface) of the computer 2200, cursor control device 100 or an external input device 2100, or sensory stimulator 1300. Optionally in step 3118, the first user can use the electronic device 1400 to control the computer 2200, cursor control device 100 or an external input device 2100, or sensory stimulator 1300.

In step 3119, a second user engages the cursor control device 100 or an external input device 2150 to interact with the interface on the display screen 1201. The second user in step 3120 selects an option on the interface, where in step 3121 the computer 220 commands cursor control device 100 to generate sensory stimulus or the cursor control device 100 generates a sensory stimulus. In step 3122, the computer 2200, cursor control device 100, or external input device 2100 can also command the sensory stimulator 1300 to generate a stimulus.

In step 3123, the first user can interact with the interactive utility or electronic device 1400 to shut down the cursor control device 100, external input device 2150, computer 2200, or sensory stimulator 1300.

In various embodiments are disclosed a product packaged for sale including a cursor control device 100 and a dongle 3100 having an executable interactive utility.

In various embodiments are disclosed a teaching system comprising a plurality of interactive computing devices of various embodiments and a control device capable of controlling operation of each of the plurality of interactive computing devices.

Figure 26:
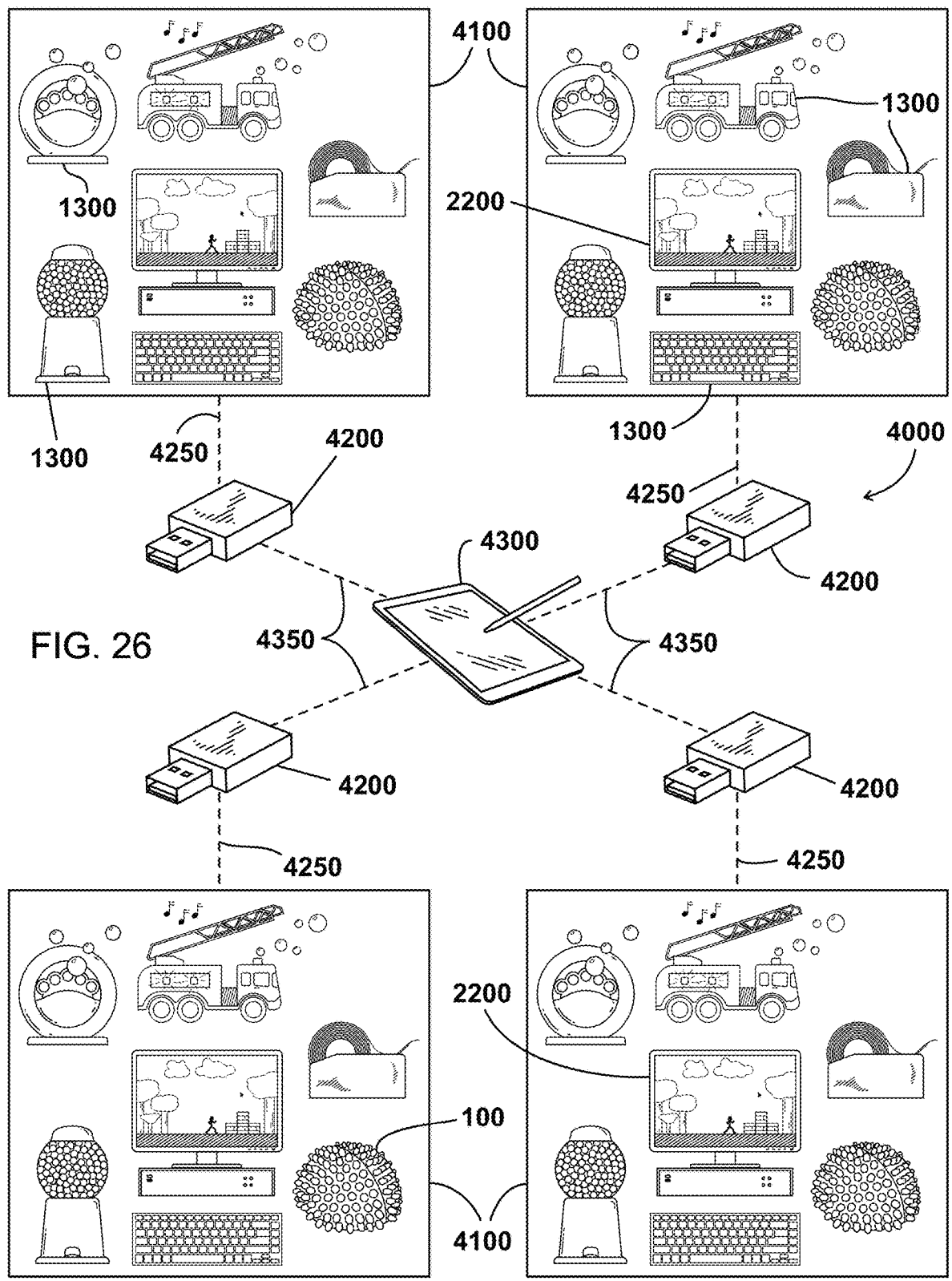
FIG. 26 is a schematic view of a teaching system of various embodiments.

FIG. 26 is a schematic view of a teaching/classroom system 4000. The teaching/classroom system 4000 can include a station 4100 or a plurality of stations 4100. The station 4100 can include interactive computing devices of any embodiment. For example, a station 4100 can include a computer 2200 connected to a cursor control device 100 and/or sensory stimulator 1300. The computer 2200 can be connected 4250 to a dongle 4200 that can also connect to the cursor control device 100 and/or the sensory stimulator 1300. Dongle 4200 is similar to or the same as the dongle of any embodiment. Dongle 4200 can also connect to a device 4300, where FIG. 26 shows the stations 4100 connecting 4250,4350 to the device 4300 via the dongles 4200. The device 4300 is capable of controlling the operational parameters of the stations 4100. The operational parameters include, for example, turning on or off or modifying the operation (i.e. sensory stimulus or interface) of the computer 2200, cursor control device 100 or sensory stimulator 1300. The device 4300 is also able to control types of interactive utilities executed on each station. For example, the device can command one station 4100 to execute an interactive utility for a game directed to teaching mathematical skills and another station 4100 to execute an interactive utility for a game directed to teaching language skills. The device 4300 can include various types of devices including, for example, computers, tablets, or mobile device such as smartphones.

In various embodiments are disclosed a system 4000 for sale including a station 4100, dongle 4200, and a device 4300.

Example 1

The following examples illustrate the various embodiments of the present invention. Those skilled in the art will recognize many variations that are within the spirit of the present invention and scope of the claims.

In various embodiments, the present invention can include:

Software on USB with optional transmitter capability.

A micro USB receiver and transmitter (MUSBRT) for receiving and/or transmitting signal that is specific to an external device or devices such as a mouse, tablet, keyboard, speaker, light, treat dispenser, fragrance dispenser, sticker dispenser, and vibration pad.

A mouse (cursor control device or other external device) designed to stimulate one or as many as five senses of the user while s/he completes tasks in applications or programs.

External devices capable of emitting an output that will appeal to one or possibly all of the five senses.

A user can be a student/participant who is learning disabled and desires a response to computer software participation such as games and learning software.

A user such as the student plays a game/program and the program sends a signal when the correct answer/response is given.

The signal goes to the USB and/or the MUSBRT and the signal goes to the external device or the devices.

The external devices can be a mouse, keyboard, pad, light, dispenser for treats, stickers, fragrance, sound, bubbles, etc.

The external device may be one device, several devices, or a combination of features.

The signal from the USB or MUSBRT can activate one external device or several devices.

The USB or MUSBRT may have an optional selection menu for external device selection.

The external devices may have an on/off switch so that features can be activated/deactivated and so that the device can be activated/deactivated.

The external device or devices has a specific code that matches to the MUSBRT and/or the USB. The MUSBRT and/or USB will only receive and transmit to the specific coded devices.

The program may be in a network where a student/participant/teacher signs into a specific computer that has a specific MUSBRT for their device or devices.

A mouse, keyboard, or other device that is coded for the corresponding MUSBRT will transmit signals to the MUSBRT and operate the computer and program. When a correct response is given, a signal is sent to the response device or devices from the MUSBRT.

The response devices will be able to trigger a response that will stimulate one or more of the student's five senses: sight, smell, hearing, taste, and touch.

The system will be Bluetooth compatible and will have the capability to coordinate with external devices wirelessly.

Who: Designed for children and people with learning disabilities.

What: Computer gratification, positive response.

When: Response to usage (all five senses-sight, smell, hearing, taste, and touch). Where: Home and/or classroom.

Why: There is not a current system in the classroom.

The computer responds to the input device such as a mouse or other input device through the Micro USB receiver/transmitter. When a correct answer is given, the program sends a signal to the Micro USB receiver/transmitter and it sends a signal to the response device. The mouse, keyboard, ipad, and/or dispenser will light up, give off a fragrance, sound, dispense something to taste and/or vibrate (depending on functions pre-set by the user). The mouse may perform all of the functions or some of the functions. The device maybe a dispenser of stickers, treats, sounds, fragrance or a pad that vibrates, or other devices, and may be interfaced with the mouse if needed.

Software.

Design the mouse with dispenser interface.

The Micro USB receiver/transmitter interacts with the coded devices for input and response.

The Micro USB receiver/transmitter sends a signal to the device and/or a USB sends a signal (an example is a Logitech mouse with nano receiver).

Signal to one device or several devices.

On/Off switches on devices. On/Off switches on companion application for device and On/Off switches for individual features on the device.

Example 2

The following examples illustrate the various embodiments of the present invention. Those skilled in the art will recognize many variations that are within the spirit of the present invention and scope of the claims.

The cursor control device or mouse design package can begin with three mice each having (up to) 5 sense components. The mouse and system can be designed in 3 or more shapes. The Hedgehog, Hedgehog E-Series or Ergonomic Series, and the Prickly Pear. The mice can have the capability to respond back with impulses (visual, auditory, tactile-vibration, as well as scent and taste response) for positive feedback to learning-based computer games. The mouse can have the functions housed within it to send a cursory signal to a dongle (or MicroUSB) which can send a response to the computer and then back to the mouse. The mouse could also send the signal to other devices including but not limited to a smart TV, PC, SMART boards in classrooms, smart phones, iPads, and more.

The mice are designed for the learning disabled or for children aged 12 and younger in a classroom or other environment. The mouse is intended to be paired with a software program that rewards user's positive action(s) in the game.

The mouse package will have the following items:

Mouse of choice (Hedgehog, Hedgehog-E Series, or Prickly Pear)

Charging dock/cord

USB (for optional plug in use)

Dongle/MicroUSB

Directions/instructions including unique Bluetooth input code

From teacher perspective:

Teacher can give each student a mouse/screen (laptop, PC, ipad). Teacher affixes dongle to laptop, ipad, PC, etc.

Teacher can toggle on/off the 5 buttons on each student's mouse (audio, vibration, lights, scent, taste) OR toggle these on/off via the Hedgehog app (similar to Alexa app with an on/off button for each sense).

Student can play a learning game (i.e. Reflex Math) and will attempt to answer math facts correctly and expediently.

Student will be rewarded with mouse response from senses that have been left ON after they "beat a level" or for example, master ther X4 facts for the first time.

Teacher can have optional auxiliary sensory "rewards machines" set up in stations around the room and students can rotate to each station to play their game. One station can have the fire truck with bubbles/lights (visual station). Another station can have the candy dispenser (taste station), another with a scent dispenser (scent station), and so on.

The teacher can also have a "master code" and account so that the teacher can monitor each user's progress throughout their history of use of the mouse. Teacher can see a graph of time/correct answers and chart efficiency, as well as share optional reports to the parents/guardians of the students.

Teacher also has the option of projecting the "live stats" on a master screen so that students have the option of "racing" to the top of the leaderboard of efficiency.

LIST OF REFERENCE NUMERALS

The following is a list of reference numerals used in this specification:

| Reference Numeral | Description |
| --- | --- |
| 100, 101, 102, 103, 104, 105, 106, 107, 108, 109, 110, 111, 112, 114, 115, 116, 117, 118 | cursor control device |
| 113 | cover |
| 151, 152, 153, 154, 155, 156, 157, 158, 159, 160161, 162, 164, 165, 166, 167, 168 | housing |
| 201, 205, 209, 210, 211, 212, 213 | section |
| 221, 225, 229, 230, 231, 232, 233 | surface |

-continued

| Reference Numeral | Description |
|---|---|
| 241, 249, 250, 251, 252 | projection |
| 266 | dimension |
| 267, 268, 269, 270, 271, 272, 273, 274, 275, 276, 277, 278, 279, 280 | size/shape/color/texture |
| 301, 302, 304, 305, 306, 307, 308, 309, 310, 311, 312, 313 | section |
| 321, 322, 325, 328, 329, 330, 331, 332, 333 | surface |
| 341, 342, 346, 347, 349, 350, 351, 352 | projection |
| 366 | dimension |
| 368, 369, 370, 371, 372, 373, 374, 375, 376, 377, 378, 379, 380, 381, 382, 383 | size/shape/color/texture |
| 405 | section |
| 425 | surface |
| 445 | projection |
| 468, 469 | size/shape/color/texture |
| 503, 504 | divider |
| 524 | strap |
| 601 | base |
| 602 | opening |
| 603 | plate |
| 604 | micro-switch |
| 605 | processor |
| 606 | processor |
| 607 | RF or Bluetooth module |
| 608 | light emitting diode/prism |
| 700 | sensory stimulator |
| 701 | light emitting diode |
| 702 | sound generator |
| 703 | vibration device |
| 800 | sensory stimulator |
| 815 | edible film dispenser/label/sticker dispenser |
| 816 | bubble generating device |
| 817 | scent dispensing device |
| 826 | bubble |
| 827 | scent |
| 828, 829, 830 | opening |
| 850 | housing |
| 851 | roll |
| 852 | gear |
| 853 | motor |
| 854 | gear |
| 855 | battery |
| 856 | controller |
| 860 | housing |
| 861 | wand |
| 862 | bubble ring |
| 863 | arm |
| 864 | reservoir |
| 865 | solution |
| 866 | rotor |
| 867 | motor |
| 868 | blade/fan |
| 869 | motor |
| 870 | controller |
| 871 | battery |
| 880 | reservoir |
| 881 | fluid |
| 882 | pressurized gas |
| 883 | tubing |
| 884 | inlet |
| 885 | arrow |
| 886 | shaft |
| 887 | opening |
| 888 | outlet |
| 889 | controller |
| 890 | motor |
| 891 | screw gear |
| 892 | lever |
| 893 | battery |
| 894 | bottom bolt |
| 895 | middle bolt |
| 896 | top bolt |

-continued

| Reference Numeral | Description |
|---|---|
| 897 | scent dispensing element |
| 900 | cursor control device/mouse |
| 901 | button |
| 902 | action set processor |
| 903 | credentials |
| 1000, 2000, 3000 | interactive computing device/system |
| 1001, 1001', 1002, 1002', 1003, 1003' 1004 | connection |
| 1005, 1006, 1007, 1008, 1009, 1010, 1011, 1012, 1013, 1014, 1015, 1016 | step |
| 1200, 2200, 4300 | computer/computing device |
| 1201 | display screen |
| 1202 | adapter |
| 1203 | processor |
| 1204 | memory |
| 1205 | system bus |
| 1206 | wireless adapter |
| 1207 | storage |
| 1208 | operating system |
| 1209 | driver |
| 1210 | applications |
| 1211 | interactive utility |
| 1212 | removable storage drive |
| 1213 | transceiver |
| 1300 | sensory stimulator |
| 1301 | treat dispenser |
| 1302 | bubble generating device |
| 1303 | light/sound/bubble generating device |
| 1304 | edible film dispenser/label/sticker dispenser |
| 1305 | keyboard |
| 1306 | wireless adapter |
| 1307 | wireless transceiver/receiver |
| 1308 | processor |
| 1400 | electronic device |
| 1407 | wireless transceiver/receiver |
| 1406 | wireless adapter |
| 1408 | processor |
| 1409 | input |
| 2001, 2002, 2003, 2004, 2005, 2006 2007, 2008, 2009, 2010, 2011, 2012 2013, 2014, 2015, 2016, 2017, 2018 2019 | connection |
| | step |
| 2100, 2150 | external input device |
| 3100, 4200 | dongle |
| 3101 | processor |
| 3102 | transceiver |
| 3103 | connector |
| 3104 | memory |
| 3105 | storage |
| 3106, 3107, 3108, 3109 3110, 3111, 3112, 3113, 3114, 3115 3116, 3117, 3118, 3119, 3120, 3121 3122, 3123 | connection |
| 4000 | system |
| 4100 | station |
| 4200 | dongle |
| 4250, 4350 | connection |
| 4300 | device |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cursor control device for a computer or other electronic device, the cursor control device comprising:

a housing segmented to define a plurality of sections and having an outer surface, where the plurality of sections includes a first section and a second section;

a sensor positioned within the housing and configured to generate data for translating motion and position of the cursor control device to move and position a cursor on a display screen of the computer or other electronic device;

a first plurality of projections disposed on the first section and extending in a plurality of directions from the outer surface;

a second plurality of projections disposed on the second section and extending in a plurality of directions from the outer surface, the second plurality of projections having at least one of a size, shape, color, and texture that is different from the first plurality of projections;

wherein at least one of the first and second sections is configured to be an actuator; and a sensory stimulator positioned within or on the housing and configured to provide a sensory stimulus to a sense of smell or taste of a user, wherein the sensory stimulator is selected from an edible object dispenser or a scent dispensing device.

2. The cursor control device of claim 1 further comprising a third plurality of projections disposed on a third section of the plurality of sections and extending from the outer surface, wherein the third plurality of projections has at least one of a size, shape, color, and texture that is different from the first plurality of projections and the second plurality of projections.

3. The cursor control device of claim 1, wherein the first and second sections of the housing are both configured to be actuators.

4. The cursor control device of claim 1, wherein the first section of the housing has a color or texture that is different from the second section of the housing.

5. The cursor control device of claim 1, wherein at least one of the first or second sections has a color or texture that is different from the color or texture of at least one of the first plurality of projections and second plurality of projections.

6. The cursor control device of claim 1 further comprising a plurality of sensory stimulators positioned within or on the housing and capable of generating stimuli for stimulating up to five senses of a user, wherein the plurality of sensory stimulators includes at least one of a light generator, an edible film dispenser, and a scent dispensing device.

* * * * *